United States Patent
Nagashima et al.

(10) Patent No.: US 9,434,175 B2
(45) Date of Patent: Sep. 6, 2016

(54) LIQUID STORAGE CONTAINER

(71) Applicant: SEIKO EPSON CORPORATION, Tokyo (JP)

(72) Inventors: Takumi Nagashima, Nagano (JP); Hiroyuki Kawate, Yamanashi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/657,224

(22) Filed: Mar. 13, 2015

(65) Prior Publication Data
US 2015/0258803 A1 Sep. 17, 2015

(30) Foreign Application Priority Data

Mar. 14, 2014 (JP) ................................. 2014-051167

(51) Int. Cl.
*B41J 2/175* (2006.01)
*B01D 19/00* (2006.01)

(52) U.S. Cl.
CPC ............. *B41J 2/17563* (2013.01); *B41J 2/175* (2013.01); *B01D 19/0031* (2013.01); *B41J 2/17513* (2013.01)

(58) Field of Classification Search
CPC ............ B41J 2/17513; B41J 2/17563; B01D 19/0031
See application file for complete search history.

(56) References Cited

U.S. PATENT DOCUMENTS

| 4,489,334 | A * | 12/1984 | Owatari ........................ 347/92 |
| 6,540,321 | B1 | 4/2003 | Hirano et al. |
| 6,824,261 | B2 * | 11/2004 | Watari et al. ................... 347/97 |
| 2002/0063759 | A1 | 5/2002 | Hirano et al. |
| 2002/0109760 | A1 * | 8/2002 | Miyazawa ........... B41J 2/17503 347/86 |
| 2005/0204921 | A1 | 9/2005 | Ishizawa et al. |
| 2007/0229635 | A1 * | 10/2007 | Taira ................... B41J 2/14024 347/93 |
| 2010/0201759 | A1 * | 8/2010 | Kawase ............... B41J 2/17509 347/85 |
| 2010/0289856 | A1 * | 11/2010 | Yamamoto .......... B41J 2/17513 347/85 |

FOREIGN PATENT DOCUMENTS

| CN | 1284431 A | 2/2001 |
| JP | 2005-169851 A | 6/2005 |
| JP | 2007-090734 A | 4/2007 |

* cited by examiner

*Primary Examiner* — Stephen Meier
*Assistant Examiner* — John P Zimmermann
(74) *Attorney, Agent, or Firm* — Global IP Counselors, LLP

(57) ABSTRACT

A liquid storage container includes a liquid storage portion configured and arranged to store liquid, and a liquid supply portion having a liquid supply flow path provided to supply the liquid in the liquid storage portion to a liquid ejecting apparatus. The liquid storage container further includes a filter unit arranged inside of the liquid storage portion and connected to the liquid supply portion. The filter unit has a first opening connecting to the liquid supply flow path, a second opening connecting to an interior of the liquid storage portion, a connection flow path connecting the first opening and the second opening, a filter chamber arranged in the connection flow path with a filter being installed in the filter chamber, and a low pressure chamber connecting to the interior of the liquid storage portion at a different position from the connection flow path and having pressure lower than atmospheric pressure.

7 Claims, 27 Drawing Sheets

CROSS-SECTIONAL VIEW OF F9-F9 PART

LIQUID STORAGE CONTAINER

CROSS-REFERENCE TO RELATED APPLICATIONS

This application claims priority to Japanese Patent Application No. 2014-051167 filed on Mar. 14, 2014. The entire disclosure of Japanese Patent Application No. 2014-051167 is hereby incorporated herein by reference.

BACKGROUND

1. Technical Field

The present invention relates to a technology for supplying liquid to a liquid ejecting apparatus.

2. Related Art

Previously known technologies were such that a low pressure container having a pressure lower than atmospheric pressure were arranged inside of a liquid container to absorb the air dissolved in a liquid stored in the liquid container (e.g., Japanese Laid-Open Patent Publication No. 2005-169851). In addition, technologies are known that arrange a filter in the output of a flow path through which the ink in an ink storage chamber flows to the outside in order to remove foreign matter, such as contaminants in the ink (e.g., Japanese Laid-Open Patent Publication No. 2007-90734). This filter is a foam-like filter.

In the technology in Japanese Laid-Open Patent Publication No. 2005-169851 described above, there is no filter, and a concern is the outflow of foreign matter, such as contaminants, from a supply port, when foreign matter, such as contaminants, is present in the liquid. In addition, in the technology in Japanese Laid-Open Patent Publication No. 2007-90734 described above, air bubbles generated in the ink storage chamber attach to the foam-like filter, and a concern is obstruction of the outflow of ink to the outside. In addition, there is the possibility that the air bubbles attached to the foam-like filter may not be removable, for example, when an operation is performed to suction from the head side (cleaning operation).

Consequently, an objective of the present invention is to provide a technology that is able to smoothly supply liquid to a liquid ejecting apparatus while suppressing the outflow of foreign matter generated in the liquid in the liquid storage portion to the liquid ejecting apparatus. In addition, lower costs, fewer resources, easier manufacturing, and improved usability are desired for the conventional technology.

SUMMARY

The present invention solves at least a portion of the problems described above and can be implemented in the following aspects.

(1) According to an aspect of the present invention, a liquid storage container includes a liquid storage portion configured and arranged to store liquid, and a liquid supply portion having a liquid supply flow path provided in an interior of the liquid supply portion, the liquid supply flow path being configured and arranged to supply the liquid in the liquid storage portion to a liquid ejecting apparatus. The liquid storage container further includes a filter unit arranged inside of the liquid storage portion and connected to the liquid supply portion. The filter unit has a first opening connecting to the liquid supply flow path, a second opening connecting to an interior of the liquid storage portion, a connection flow path connecting the first opening and the second opening, a filter chamber arranged in the connection flow path with a filter being installed in the filter chamber, and a low pressure chamber connecting to the interior of the liquid storage portion at a different position from the connection flow path, the low pressure chamber having pressure lower than atmospheric pressure.

According to the liquid storage portion in this aspect, the filter unit can more efficiently capture the foreign matter by using the filter. By doing this, the possibility of foreign matter flowing out to the liquid ejecting apparatus side can be reduced. In addition, generally, the air bubbles generated in the liquid easily attach to the filter. However, according to the liquid storage container in this aspect, air in the liquid is absorbed by the low pressure chamber, and the possibility of air bubbles attaching to the filter can be reduced. By doing this, liquid can be smoothly supplied from the liquid storage container to the liquid ejecting apparatus.

(2) In the liquid storage container in the above aspect, the low pressure chamber may be adjacent to the filter chamber.

According to the liquid storage container in this aspect, by placing the low pressure chamber adjacent to the filter chamber, air bubbles in the liquid in the surroundings of the filter chamber in the liquid storage portion can be efficiently absorbed by the low pressure chamber. Thus, the possibility of the air bubbles attaching to the filter can be further reduced. And, the liquid can be more smoothly supplied from the liquid storage container to the liquid ejecting apparatus.

(3) The liquid storage container in the above aspect also has a flow path forming member arranged in the liquid storage portion to introduce the liquid in the liquid storage portion through the second opening to the connection flow path. The flow path forming member may have a connection portion connected to the second opening, and an introduction portion that introduces the liquid of the liquid storage portion into the flow path forming member at a position further separated from the filter unit than the connection portion.

According to the liquid storage container of this aspect, the liquid that is introduced to the interior of the flow path forming member from the introduction portion that is arranged further from the filter unit than the connection portion flows through the second opening to the filter chamber. By doing this, the foreign matter included in the liquid at a position separated from the filter unit in the liquid in the liquid storage portion can be captured by the filter.

(4) In the liquid storage container in the above aspect, the upstream side of the flow path after passing through the filter in the filter chamber may be configured to have a smaller cross-sectional area of the flow path than the downstream side of the flow path in a flow direction of the liquid that flows in the connection flow path from the second opening to the first opening.

According to the liquid storage container of this aspect, the possibility of the liquid passing through only a portion of the filter can be reduced. By doing this, the possibility of concentrating and catching foreign matter only in a portion of the filter can be reduced; and foreign matter in the liquid can be efficiently captured by using the entire filter.

(5) In the liquid storage container in the above aspect, the liquid supply portion has a supply portion-side engagement portion configured and arranged to be engaged with the filter unit. The filter unit has a unit-side engagement portion configured and arranged to be engaged with the supply portion-side portion. The liquid supply portion may be pushed into the first opening of the filter unit, and a portion of the filter unit may join to the liquid storage portion.

According to the liquid storage container of this aspect, the filter unit is secured to the liquid supply portion and the liquid storage portion. By doing this, even if a shock is applied to the liquid storage container, such as when the liquid storage container drops down, the possibility of the filter unit falling off of the liquid supply portion can be reduced. Thus, the filter unit can be used to stably capture foreign matter in the liquid.

(6) In the liquid storage container of the above aspect, a portion of the liquid supply portion may be joined to the liquid storage portion.

According to the liquid storage container of this aspect, the liquid supply portion and the filter unit are secured to each other by engaging and applying pressure, and are joined to the liquid storage portion. By doing this, the possibility of the filter unit falling off of the liquid supply portion can be further reduced.

The entire plurality of structural elements in each aspect of the present invention described above is not necessary. To solve a portion or all of the problems described above, or to achieve a portion or all of the effects described in this Specification, a portion of the structural elements from among the plurality of structural elements can be appropriately modified, removed, or replaced by other new structural elements, and partial deletion of limited content is possible. In addition, to solve a portion or all of the problems described above, or to achieve a portion or all of the effects described in this Specification, a portion or all of the technical features included in the aspects of the present invention described above is combined with a portion or all of the technical features included in other aspects of the present invention described above, and can be an independent aspect of the present invention.

For example, in one aspect of the present invention, the filter unit can be implemented as an apparatus provided with at least one element in the plurality of elements of the first opening, the second opening, the connection flow path, the filter chamber, and the low pressure chamber. That is, this apparatus may have or not have a first opening. In addition, this apparatus may have or not have a second opening. In addition, this apparatus may have or not have a connection flow path. In addition, this apparatus may have or not have a filter chamber. In addition, this apparatus may have or not have a low pressure chamber. According to this aspect, it is possible to solve at least one of the various problems, such as reducing the size, lowering the cost, reducing the resources, facilitating manufacturing, and improving the usability of the apparatus. A portion or all of the technical features of each aspect of the liquid storage container described above can be applied to this apparatus.

The present invention can be implemented in various aspects, and can be implemented, for example, in an aspect of a manufacturing method of the liquid storage container and a liquid ejecting system that is provided with a liquid storage container and a liquid ejecting apparatus, in addition to the liquid storage container.

BRIEF DESCRIPTION OF THE DRAWINGS

Referring now to the attached drawings which form a portion of this original disclosure.

DETAILED DESCRIPTION OF EXEMPLARY EMBODIMENTS

A. Embodiment

A-1. Configuration of Liquid Ejecting System

Figure 1:
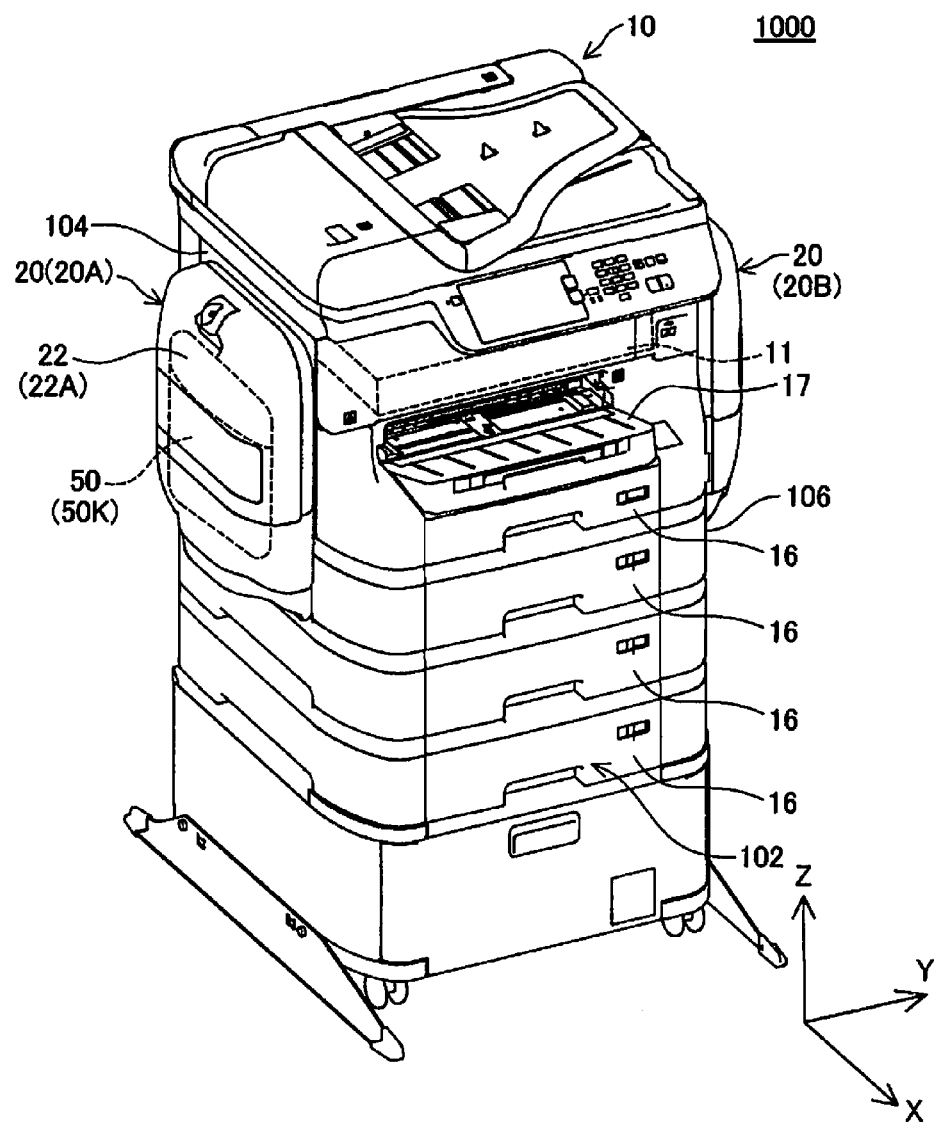
FIG. 1 is a first perspective diagram showing a schematic structure of the liquid ejecting system.
Figure 2:
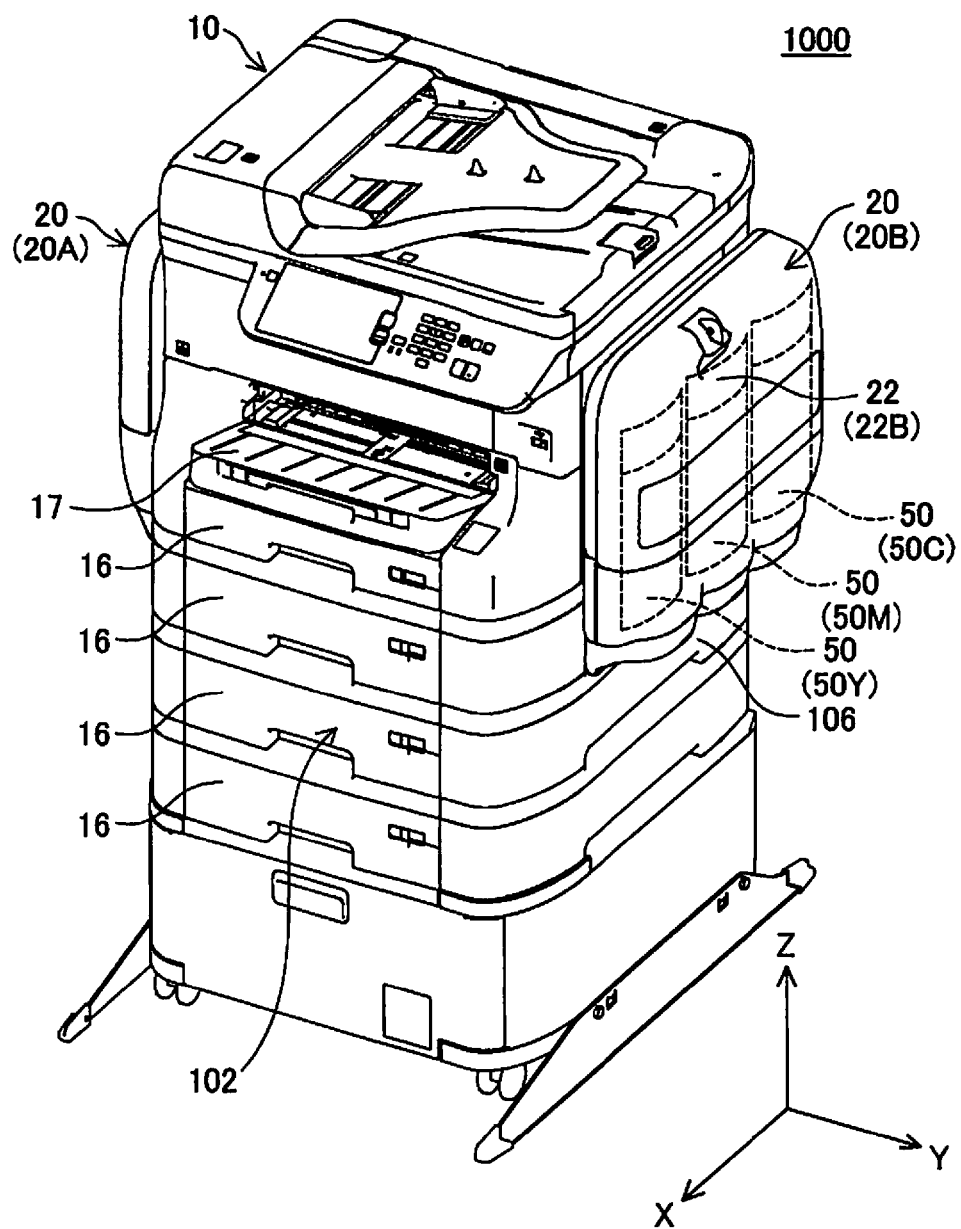
FIG. 2 is a second perspective diagram showing a schematic structure of the liquid ejecting system.
Figure 3:
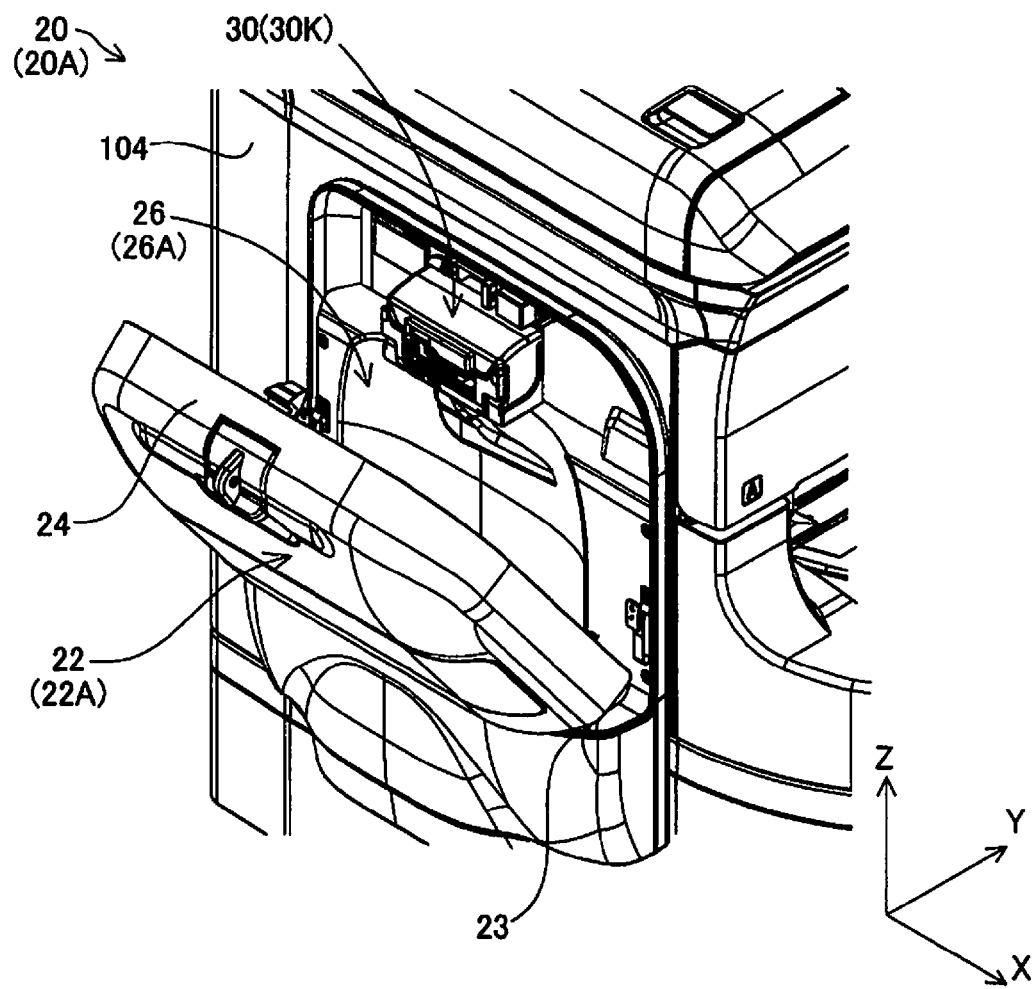
FIG. 3 is a first diagram for explaining the liquid supply apparatus.
Figure 4:
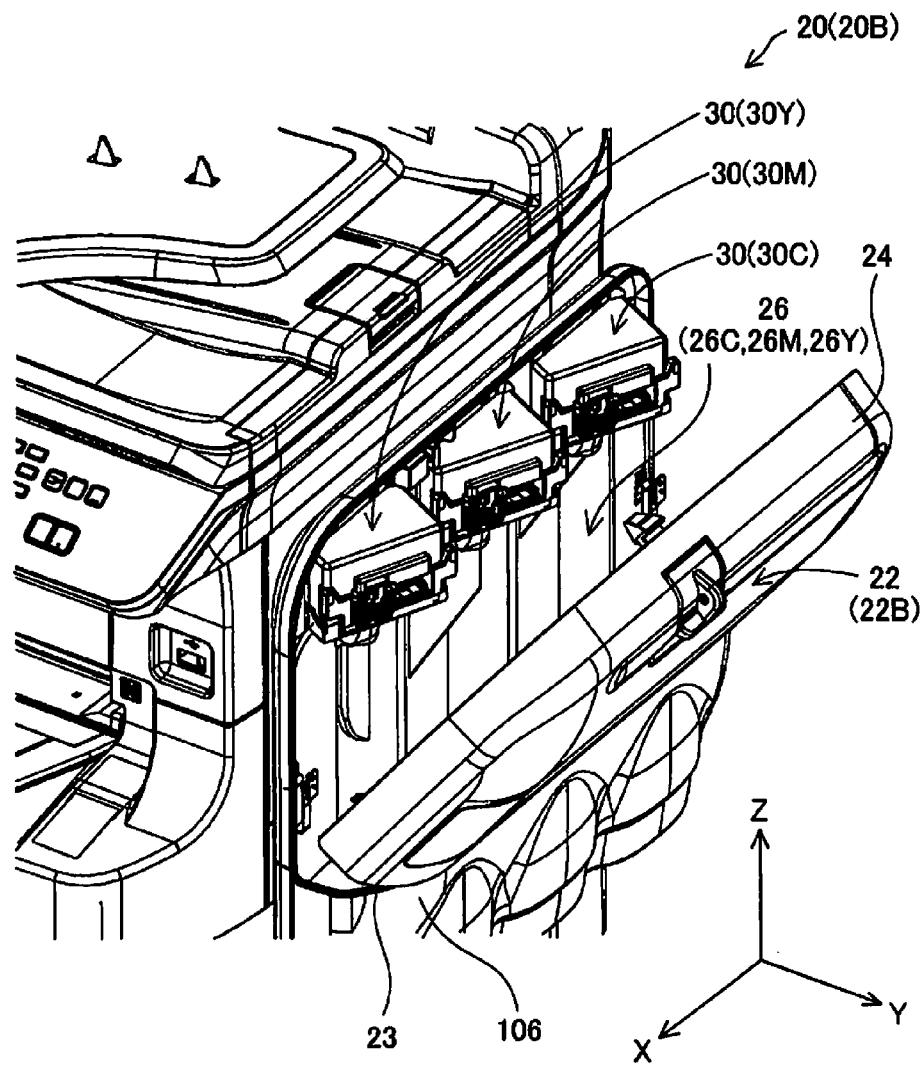
FIG. 4 is a second diagram for explaining the liquid supply apparatus.

FIG. 1 is a first perspective diagram showing the schematic structure of a liquid ejecting system 1000. FIG. 2 is a second perspective diagram showing the schematic structure of the liquid ejecting system 1000. FIG. 3 is a first view for explaining the liquid supply apparatus 20. FIG. 4 is a second view for explaining the liquid supply apparatus 20. In FIG. 3 and FIG. 4, the state is shown in which a liquid storage body to be described later is removed. In FIG. 1 to FIG. 4, the XYZ axes, which are mutually orthogonal, are drawn.

As shown in FIG. 1, the liquid ejecting system 1000 is provided with a printer 10 as the liquid ejecting apparatus and two liquid supply apparatus 20. In the use state of the liquid ejecting system 1000, the printer 10 is arranged in a horizontal plane that is defined by the X axis direction and the Y axis direction. In other words, the Z axis direction is the perpendicular direction (up and down direction). In addition the −Z axis direction is the downward perpendicular direction. The +Z-direction is the upward perpendicular direction. The liquid supply apparatus 20 supplies ink as the liquid in the printer 10. Liquid storage containers 50 provided by the liquid supply apparatus 20 can be connected (installed) to enable installation to and removal from the printer 10.

The printer 10 is an inkjet printer. The printer 10 is provided with a recording mechanism 11, a sheet feeding tray 16, and an ejection tray 17. A plurality of sheet feeding trays 16 is provided at different height positions in the perpendicular direction. A sheet feeding tray 16 is provided in a first surface 102 (front surface of apparatus) of the printer 10. The recording medium (e.g., paper) that are printed (recorded) with images, such as characters, by the printer 10 are stored in the sheet feeding tray 16.

The recording mechanism 11 is provided with recording heads (not shown) that eject ink. The recording head is connected to the liquid supply apparatus 20 through a distribution pipe, such as a tube. The recording head uses the ink supplied from the liquid supply apparatus 20 to record (print) by ejecting ink onto the recording medium. The recorded recording medium is ejected to the ejection tray 17.

Two liquid supply apparatus 20 are provided in a second surface of the apparatus 104 (referred to as the first side surface of the apparatus or the first side wall of the apparatus) and a third surface 106 of the apparatus (referred to as the second side surface of the apparatus or the second side wall of the apparatus) that intersect the first surface 102 of the apparatus (referred to as the front surface of the apparatus or the front wall of the apparatus) of the printer 10. Each of the first surface 102 of the apparatus to the third surface 106 of the apparatus is a surface nearly perpendicular to the installation surface in the use state of the printer 10. The second surface 104 of the apparatus faces the third surface 106 of the apparatus. The liquid supply apparatus 20 provided in the second surface 104 of the apparatus is also referred to as a first liquid supply apparatus 20A. The liquid supply apparatus 20 provided in the third surface 106 of the apparatus is also referred to as the second liquid supply apparatus 20B. When the first and second liquid supply apparatus 20A, 20B are used without differentiation, they are simply referred to as a liquid supply apparatus 20.

As shown in FIG. 1, the first liquid supply apparatus 20A is provided with one cover member 22, one liquid storage container 50 (liquid storage pouch unit), and one detachable unit 30 (FIG. 3). As shown in FIG. 2, the second liquid supply apparatus 20B is provided with one cover member 22, three liquid storage containers 50, and three detachable units 30 corresponding to each liquid storage container 50 (FIG. 4). When the two cover members 22 are differentiated, reference numbers 22A and 22B are used. In addition, when four liquid storage containers 50 are differentiated, reference numbers 50K, 50C, 50M, and 50Y are used. In addition, when four detachable units 30 are differentiated, 30K, 30C, 30M, and 30Y are used. The numbers of cover members 22, liquid storage containers 50, and detachable units 30 are not limited to the above. For example, there may be three or fewer, or five or more liquid storage containers 50. In addition, the detachable unit 30 may be provided to correspond to the number of liquid storage containers 50. And there may be one cover member 22, or three or more.

Mutually different types of inks are stored (filled) in the four liquid storage containers 50. In this embodiment, yellow (Y), magenta (M), cyan (C), and black (K) inks are stored in the respective different liquid storage container 50. Liquid storage container 50K has a liquid storage pouch for storing black ink. Liquid storage container 50C has a liquid storage portion for storing cyan ink. Liquid storage container 50M has a liquid storage portion for storing magenta ink. Liquid storage container 50Y has a liquid storage portion for storing yellow ink. As shown in FIG. 3 and FIG. 4, the liquid storage containers 50 are stored in a storage space portion 26 partitioned by the cover members 22. Specifically, the liquid storage container 50K is stored in storage space portion 26A (FIG. 3); and the liquid storage containers 50C, 50M, 50Y are stored in storage space portion 26B (FIG. 4).

A detachable unit 30 shown in FIG. 3 and FIG. 4 is freely installed in and detached from the liquid storage container 50. The detachable unit 30K is arranged on the inner side of the cover member 22A. Detachable units 30C, 30M, 30Y are arranged on the inner side of the cover member 22B. As shown in FIG. 3, the detachable unit 30K is installed in the second surface 104 of the apparatus of printer 10. As shown in FIG. 4, the detachable units 30C, 30M, 30Y are provided on the third surface 106 of the apparatus of the printer 10. When the liquid storage container 50 is mounted to the detachable unit 30, the inks stored in the liquid storage container 50 are supplied to the recording heads of the printer 10 by a supply mechanism (not shown) that has a pump function provided by the printer 10.

As shown in FIG. 3 and FIG. 4, the cover member 22 is configured to have one edge portion 23 on the downward perpendicular side as the pivot point and to freely open and close by rotating the other edge portion 24 on the upward perpendicular side. After the ink stored in a liquid storage container 50 is exhausted, the user opens the cover member 22 and removes the exhausted liquid storage container 50 from the detachable unit 30. Then the user closes the cover member 22 after a new liquid storage container 50 is mounted onto the detachable unit 30.

A-2. Configuration of Detachable Unit 30

Figure 5:
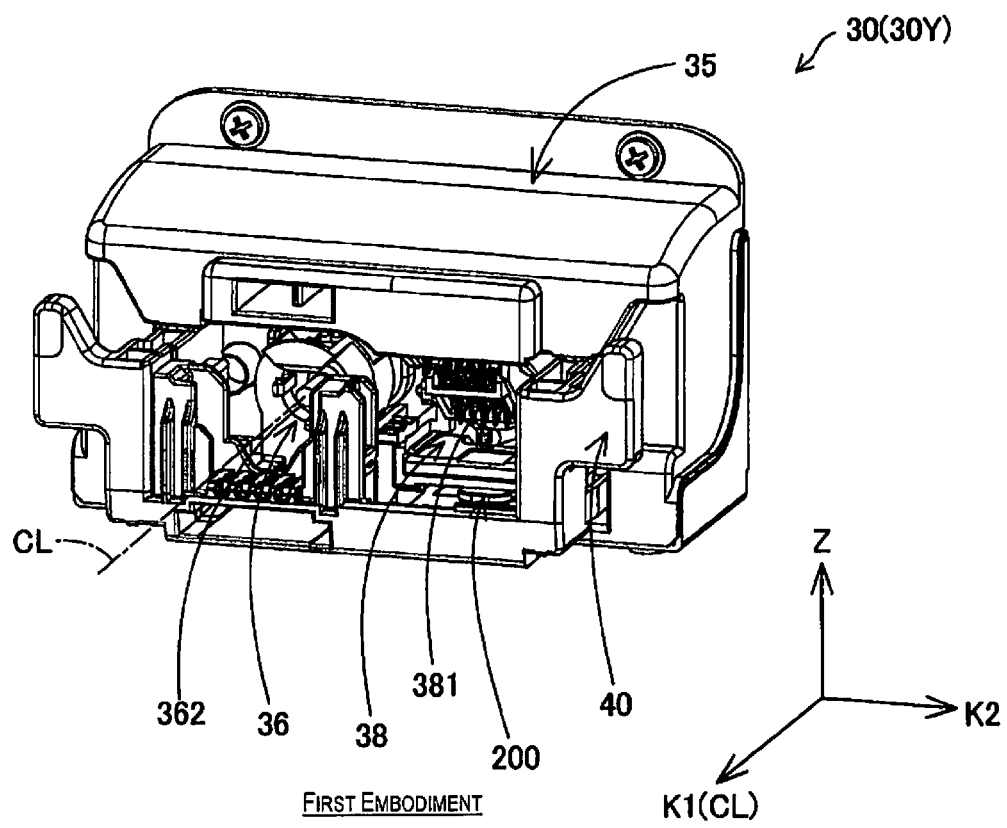
FIG. 5 is a first perspective diagram of the detachable unit.
Figure 6:
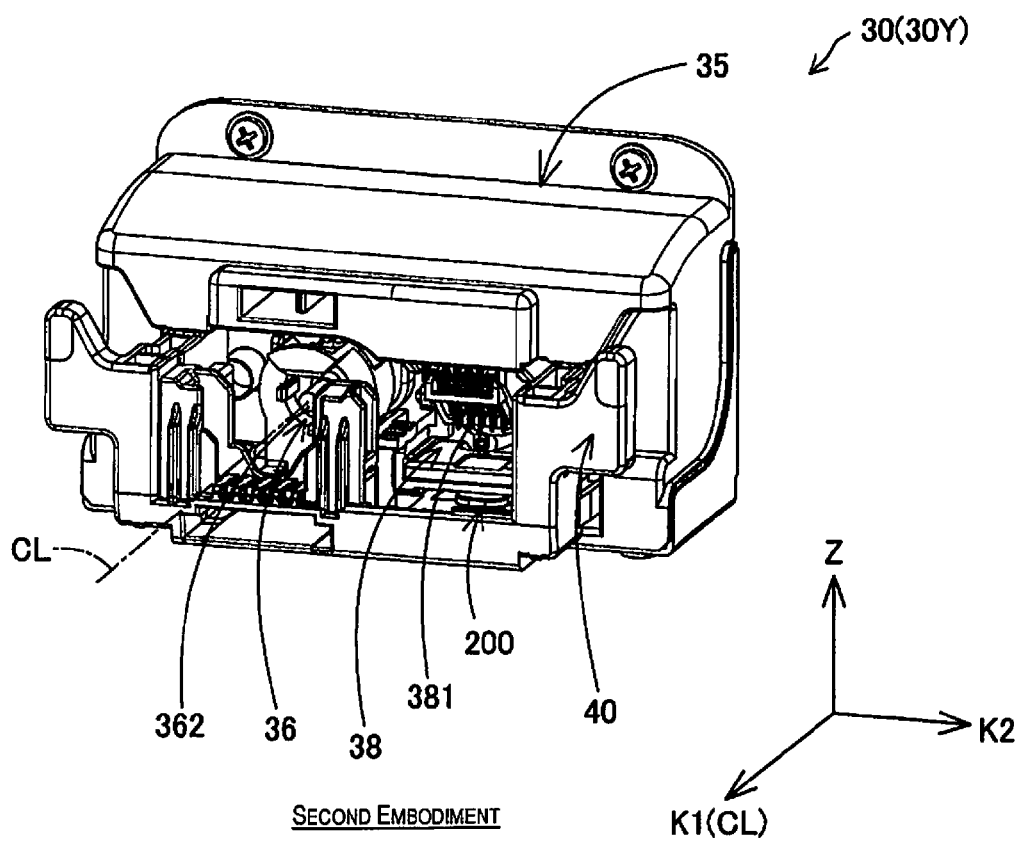
FIG. 6 is a second perspective diagram of a detachable unit.
Figure 7:
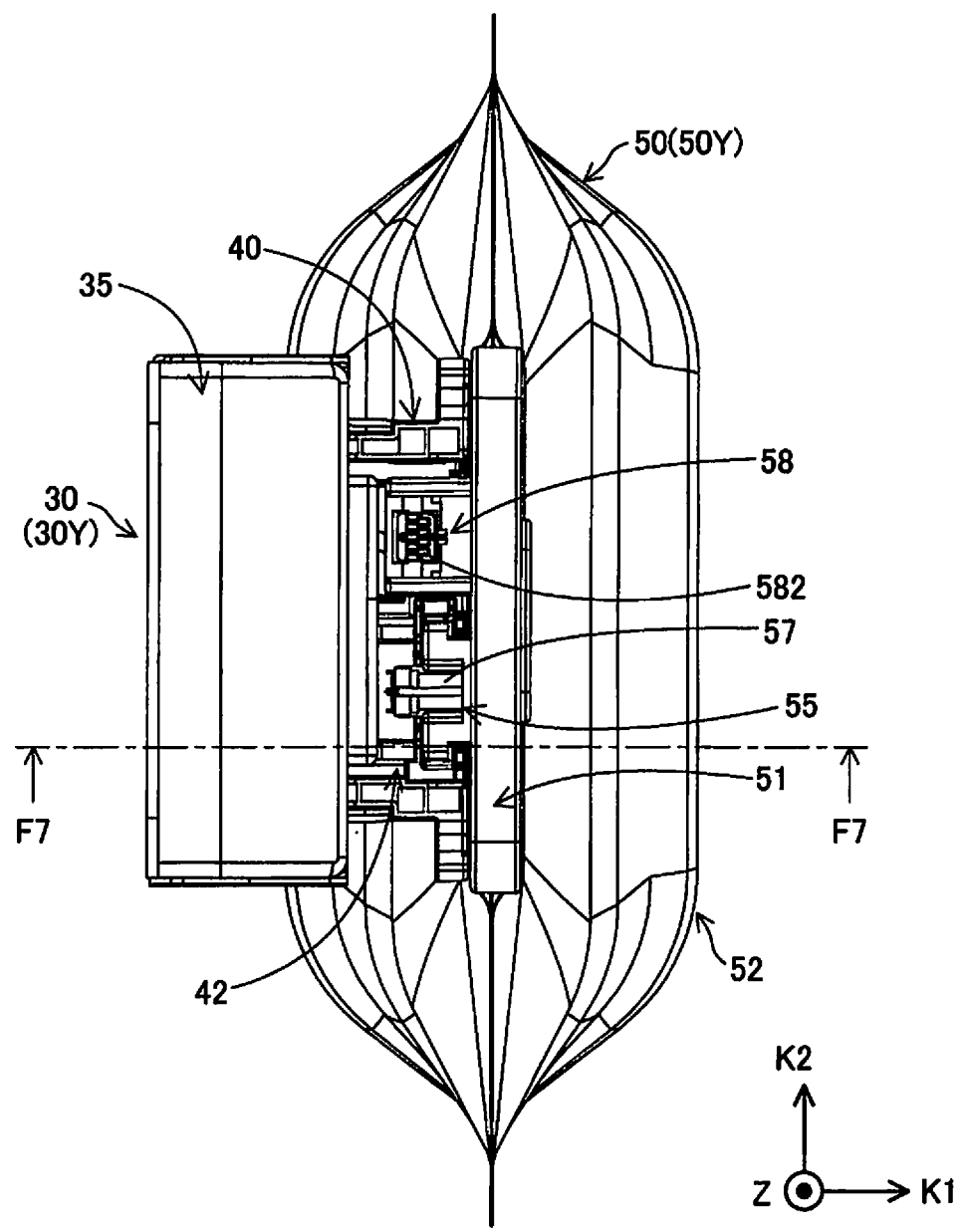
FIG. 7 is a top view of FIG. 5.
Figure 8:
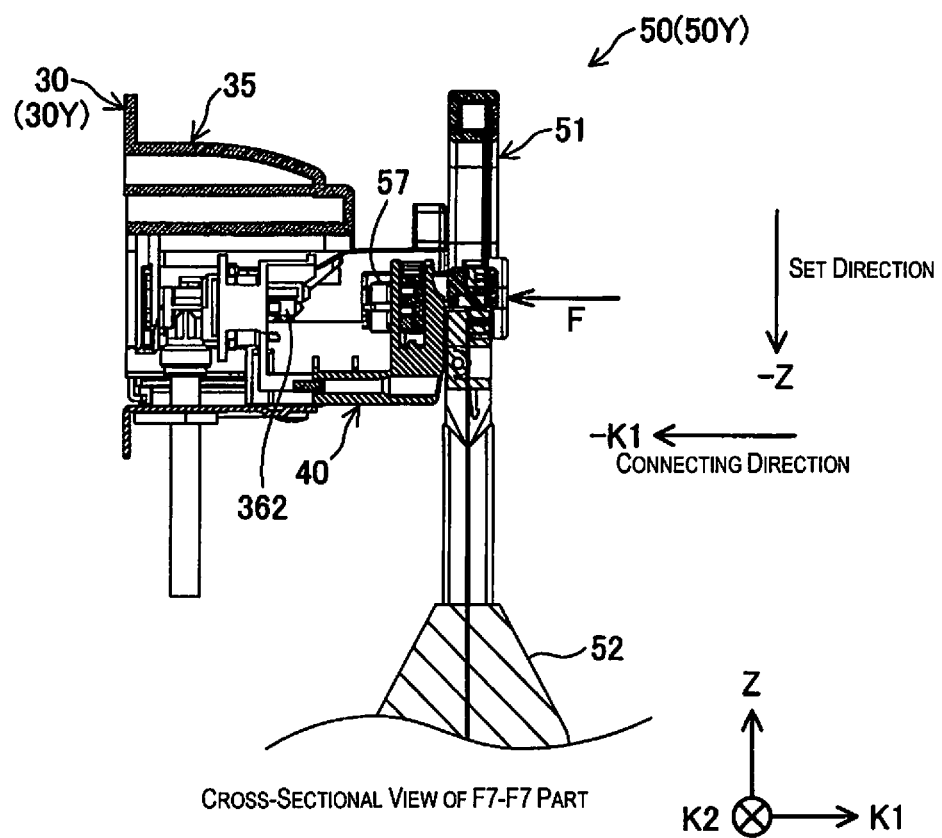
FIG. 8 is a partial cross-sectional view along F7-F7 in FIG. 7.
Figure 9:
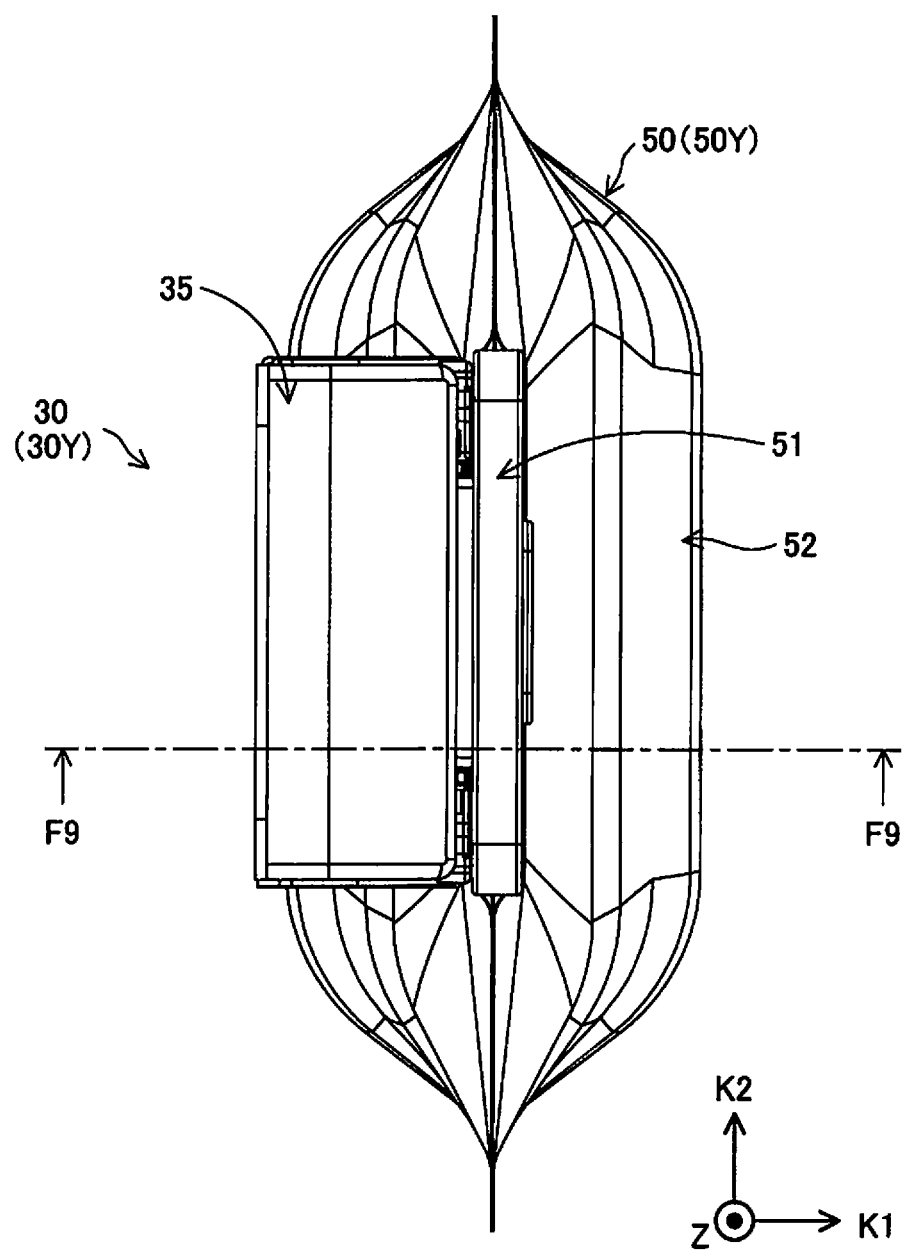
FIG. 9 is a top view of FIG. 6.
Figure 10A:
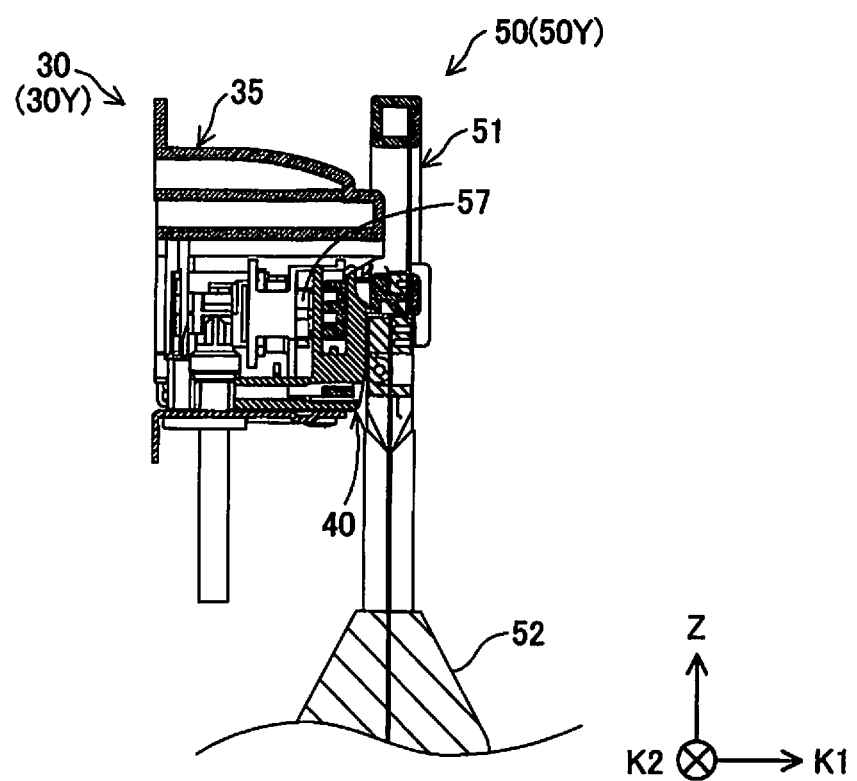
FIG. 10A is a partial cross-sectional view along F9-F9 in FIG. 9.

FIG. 5 is a first perspective diagram of the detachable unit 30. FIG. 6 is a second perspective diagram of the detachable unit 30. FIG. 7 is a top view of FIG. 5. FIG. 8 is a partial cross-sectional view along F7-F7 of FIG. 7. FIG. 9 is a top view of FIG. 6. FIG. 10A is a partial cross-sectional view along F9-F9 of FIG. 9. FIG. 5 shows a first state (state when set) in which a movable support structure 40 (movable member) projects the furthest outward with respect to the stationary structure 35. FIG. 6 shows a second state (state when installed) in which the movable support structure 40 is housed in the stationary structure 35. FIG. 7 to FIG. 10A show the liquid storage container 50 supported by the detachable unit 30. In FIG. 5 to FIG. 10A, examples of the configuration are described for the detachable unit 30C. However, the other detachable units 30K, 30M, 30Y have the same configuration as the detachable unit 30C. In FIG. 5 to FIG. 10A, the mutually orthogonal K1 axis, K2 axis, and Z axis are drawn. In subsequent drawings, the K1 axis, K2 axis, and Z axis are drawn as needed.

As shown in FIG. 5 and FIG. 6, the detachable unit 30 is provided with a stationary structure 35 (fixed portion) and a movable support structure 40. The stationary structure 35 is supported by attaching to the cabinet of the printer 10 (e.g., third surface 106 of the apparatus that is an outer wall). The movable support structure 40 is supported by the stationary structure 35 to enable motion with respect to the stationary structure 35. That is, the stationary structure 35 guides the motion of the movable support structure 40 in a first direction (−K1 axis direction) or in a second direction (+K1 axis direction). The first direction is the connection direction of the liquid storage container 50, and the second direction is the removal direction of the liquid storage container 50.

As shown in FIG. 6, the stationary structure 35 is provided with a liquid introduction mechanism 36 (liquid introduction unit) and an electrical connection mechanism 38 (electrical connection unit). The liquid introduction mechanism 36 and the contact point mechanism 38 are arranged to be aligned in the K2 axis direction. The liquid introduction mechanism 36 has a liquid introduction portion 362 that introduces the ink of the liquid storage container 50. The liquid introduction portion 362 is connected to the recording heads of the printer 10. The liquid introduction portion 362 has a needle shape that is capable of distributing the ink to the interior. The liquid introduction portion 362 has a center shaft CL and a cylindrical shape that extends in the direction of the center shaft CL. The direction along the center shaft CL (direction in which the liquid introduction portion 362 extends) is the K1 axis direction. The K1 axis direction is orthogonal to the Z axis direction and the K2 axis direction. The contact point mechanism 38 has a plurality of apparatus side terminals 381. The plurality of apparatus side terminals 381 is electrically connected to a circuit substrate by contact with the circuit substrate of the liquid storage container 50. In this embodiment, nine apparatus side terminals 381 are provided.

The surface defined by the K1 axis direction and the K2 axis direction is parallel to the surface defined by the X axis direction and the Y axis direction shown in FIG. 1. Of the K1 axis directions, the direction pointing out of the printer 10 is the +K1 axis direction; and the direction pointing into the printer 10 is the −K1 axis direction. As shown in FIG. 5 and FIG. 6, the movable support structure 40 is supported by the stationary structure 35 to enable motion in the K1 axis direction with respect to the stationary structure 35. The −K1 axis direction is the direction in which the movable support structure 40 approaches the stationary structure 35. The +K1 axis direction is the direction in which the movable support structure 40 separates from the stationary structure 35.

The liquid storage container 50 is installed on the detachable unit 30 by executing the following two operations. The state in which the liquid storage container 50 is mounted on the detachable unit 30 is referred to as the "mounted state (connected state)." The mounted state (connected state) is the state in which the liquid supply portion 57 (FIG. 7) of the liquid storage container 50 is connected to the liquid introduction portion 362 (liquid introduction needle) of the detachable unit 30, and the circuit substrate 582 (FIG. 7) of the liquid storage container 50 is electrically connected to the apparatus side terminals 381 of the detachable unit 30. The mounted state becomes the state in which the ink stored in the liquid storage container 50 can be distributed on the printer 10 side.

First Operation

Set Operation

After setting the detachable unit 30 in the first state, the user moves the liquid storage container 50 in the set direction and sets in the movable support structure 40 (FIG. 7 and FIG. 8).

Second Operation

Connected State

After the first operation, the user pushes the movable support structure 40 via the liquid storage container 50 to the stationary structure 35 to set the detachable unit 30 in the second state (FIG. 9 and FIG. 10A).

As shown in FIG. 8, the set direction is the direction that includes the downward gravity component. In this embodiment, the set direction is the downward gravity direction. The second operation is the operation that moves the movable support structure 40 in the −K1 axis direction.

As shown in FIG. 7 and FIG. 8, after the detachable unit 30 is set in the first state, the liquid storage container 50 is set in the specified position of the movable support structure 40. In the state in which the liquid storage container 50 is set (set state), the circuit substrate 582 of the substrate unit 58 of the liquid storage container 50 is arranged at the position that is opposite the apparatus side terminals 381. In the set state, the liquid supply portion 57 of the liquid storage container 50 that has a liquid supply unit 55 of the liquid storage container 50 is arranged at a position opposite the liquid introduction portion 362. In addition, as shown in FIG. 8, in the set state, the liquid storage container 50 is supported by a movable support structure 40 so that the liquid storage portion 52 is lower in the downward gravity direction than the storage portion support assembly 51.

After the liquid storage container 50 is set in the movable support structure 40, the user pushes the liquid storage container 50 in the −K1 axis direction side, as indicated by arrow F in FIG. 8. Thus, the liquid storage container 50 and the movable support structure 40 move in the connection direction (−K1 axis direction). As shown in FIG. 10A, in the second state of the detachable unit 30, the liquid introduction portion 362 is inserted (connected) into the liquid supply portion 57. In addition, in the second state, the circuit substrate 582 and the apparatus side terminals 381 of the electrical connection portion (FIG. 6) are in contact to electrically connect the circuit substrate 582 and the apparatus side terminals 381.

In the second state of the detachable unit 30, the movable support structure 40 regulates the motion in the +K1 axis direction side with respect to the stationary structure 35 by the lock mechanism 200 of the detachable unit 30. In the second state, the lock by the lock mechanism 200 is released by pushing the movable support structure 40 toward the inside direction (−K1 axis direction, first direction) with respect to the stationary structure 35. Thus, the movable support structure 40 is moved to project to the outside (+Z axis direction) with respect to stationary structure 35, and the state of the detachable unit 30 can be switched from the second state to the first state.

A-3. Flow Path Configuration of Liquid Storage Container

Figure 10B:
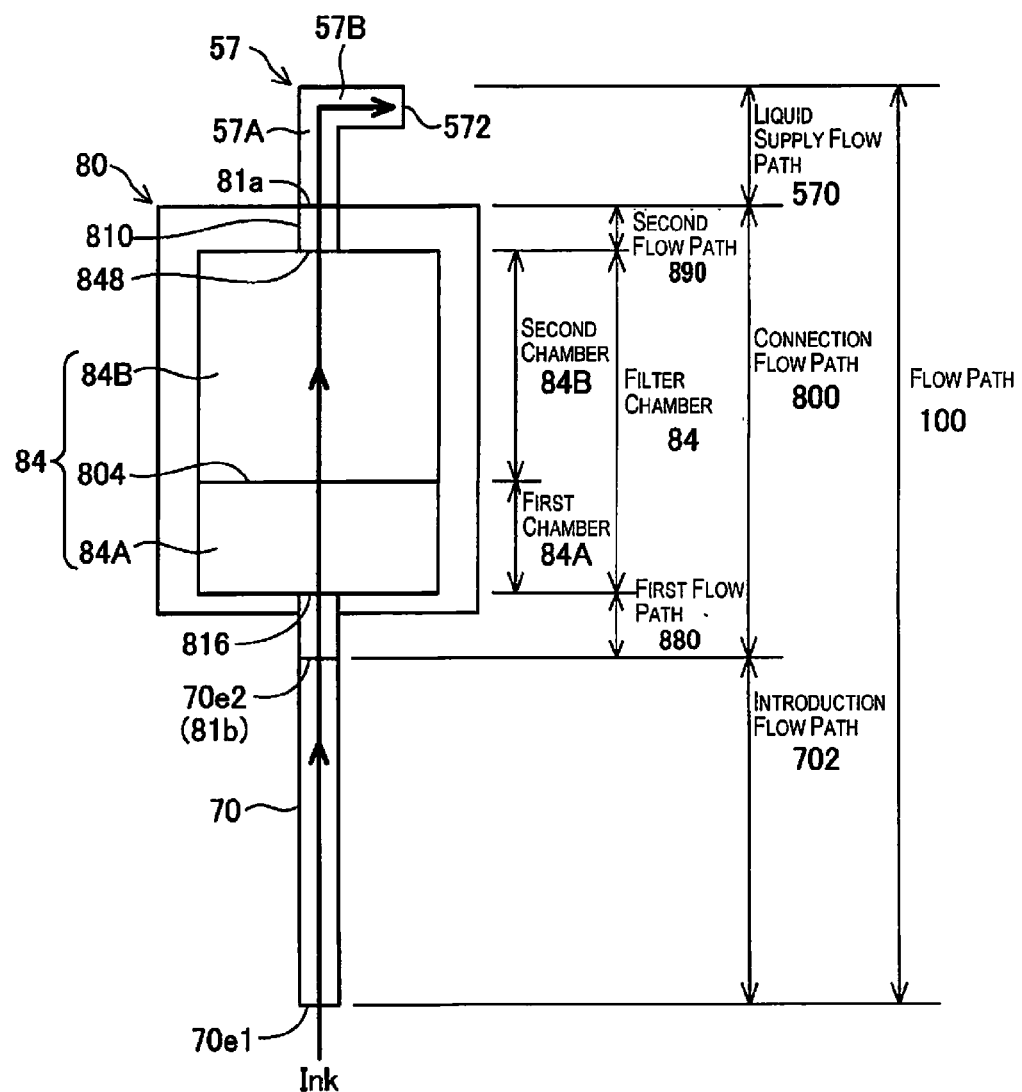
FIG. 10B is a schematic diagram for explaining the flow path of the liquid storage container.

FIG. 10B is a schematic diagram for explaining the flow path 100 of the liquid storage container 50Y. To facilitate understanding, before the configuration of the liquid storage container 50Y is explained, the flow path 100 is explained with reference to FIG. 10B. The flow path 100 is the flow path of the ink from the liquid storage portion 52 of the liquid storage container 50Y to the outside (e.g., printer 10). Here, the "upstream side" and the "downstream side" are with reference to the flow direction (supply flow path direction) of the ink from the liquid storage portion 52 to the outside.

In order from the upstream side, the flow path 100 is provided with an introduction flow path 702, a connection flow path 800, and a liquid supply flow path 570. The introduction flow path 702 is a flow path formed on the inside of the flow path forming member 70. The introduction flow path 702 has an introduction portion 70e1 that is formed on the upstream end side and a connection portion 70e2 that is formed on the downstream end side. The introduction portion 70e1 is an opening formed in the flow path forming member 70. The introduction portion 70e1 introduces the ink of the liquid storage portion 52 in the introduction flow path 702. The connection portion 70e2 is connected to a second opening 81b.

A connection flow path 800 is connected to a first opening 81a connected to a liquid supply flow path 570 and the second opening 81b connected to the interior of the liquid storage portion 52. The connection flow path 800 is provided with a first flow path 880, a filter chamber 84, and a second flow path 890 in that order from the upstream side. In the first flow path 880, the ink that passed through the introduction flow path 702 flows in through the second opening 81b. In the filter chamber 84, the ink that passed through the first flow path 880 flows in through an opening 816. In the filter chamber 84, the upstream side of the filter 804 is referred to as the first chamber 84A, and the downstream side of the filter 804 is referred to as the second chamber 84B. The first chamber 84A and the second chamber 84B are divided by the filter 804. The filter 804 is constructed from elements that can be penetrated by liquids. The foreign matter in the ink is captured by the filter 804. Thus, the foreign matter in the ink after passing through the filter 804 can be reduced. In the second flow path 890, the ink that passed through the filter chamber 84 flows in via an opening 848. The second flow path 890 is formed in the first opening forming member 810 of the filter unit 80 to be described later. In the liquid supply flow path 570, the ink that passed through the second flow path 890 flows in via the first opening 81a. The filter 804 is provided in a closed space provided in the connection flow path 800.

In addition, the first opening 81a, the second opening 81b, the connection flow path 800, and the filter chamber 84 are formed in the filter unit 80. The first opening 81a and the second opening 81b may be captured in the configuration of the connection flow path 800. In this case, the upstream end of the connection flow path 800 is the second opening 81b, and the downstream end of the connection flow path 800 is the first opening 81a.

The liquid supply flow path 570 is provided with, in order from the upstream side, a first supply flow path 57A and a second supply flow path 57B. The ink that passed through the second flow path 890 flows in the first supply flow path 57A. The first supply flow path 57A is the interior flow path of the liquid supply portion 57. The second supply flow path 57B has a liquid supply port 572 at the downstream end. The second supply flow path 57B is a flow path that projects in the –K1 axis direction in the liquid supply portion 57. The second supply flow path 57B is the flow path directly connected to the liquid introduction portion 362.

A-4. Configuration of the Liquid Storage Container 50

A-4-1. Overall Configuration of the Liquid Storage Container 50

Figure 11:
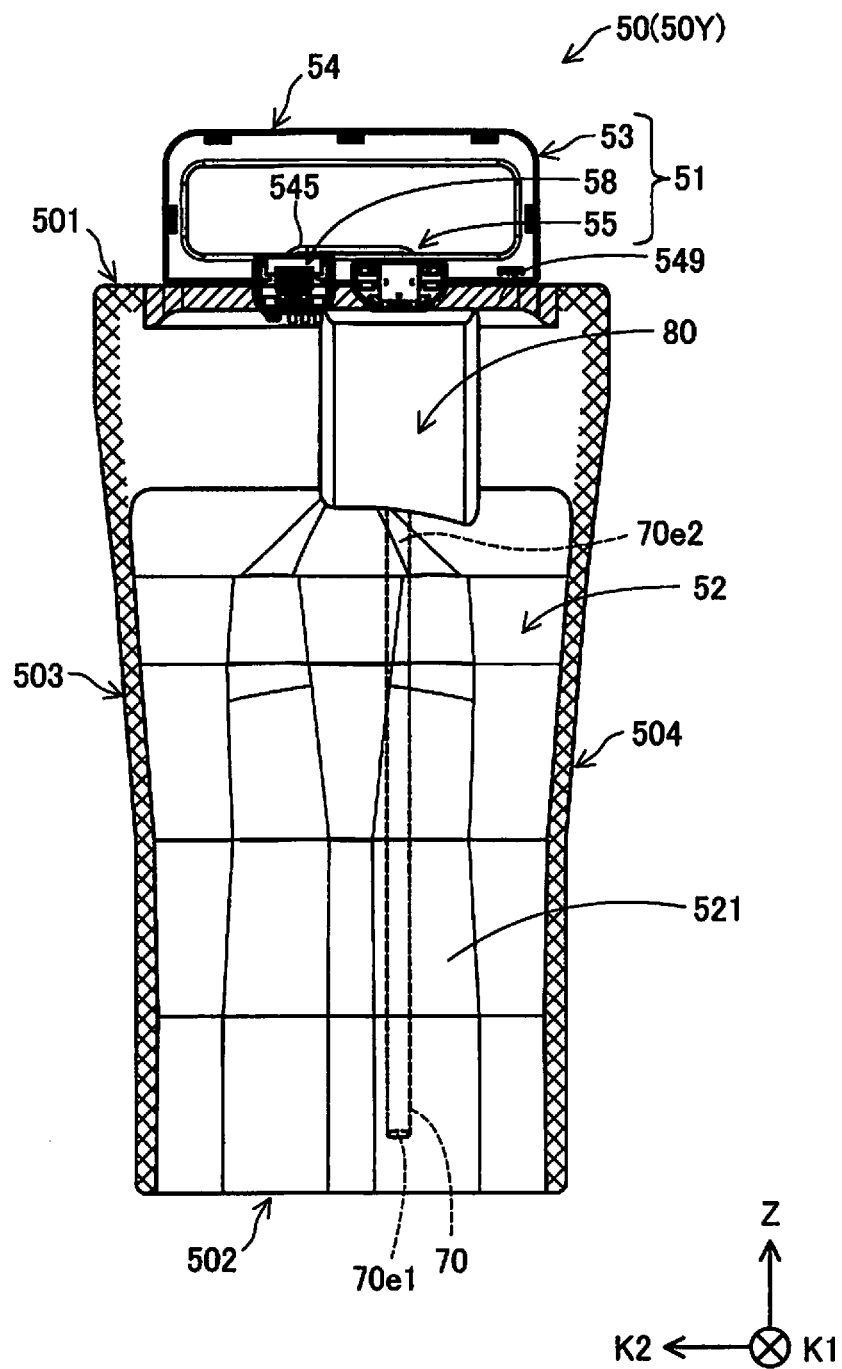
FIG. 11 is a front view of the liquid storage container.
Figure 12:
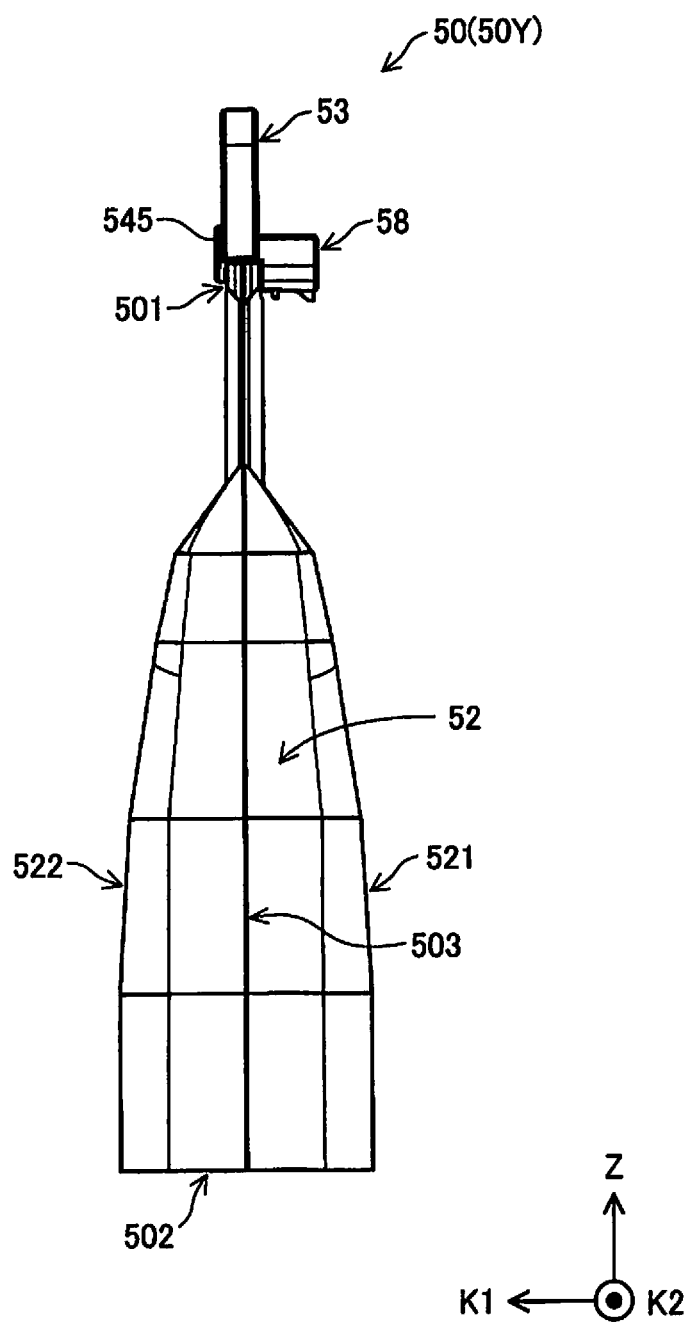
FIG. 12 is a first side view of the liquid storage container.
Figure 13:
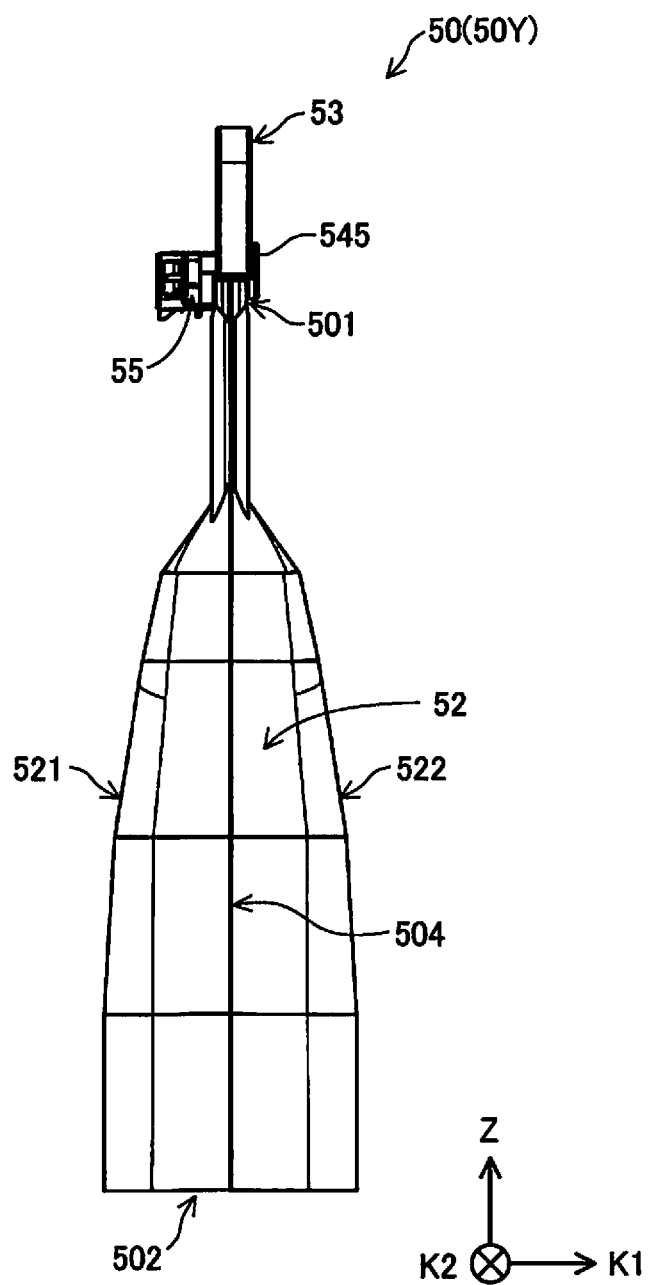
FIG. 13 is a second side view of the liquid storage container.
Figure 14:
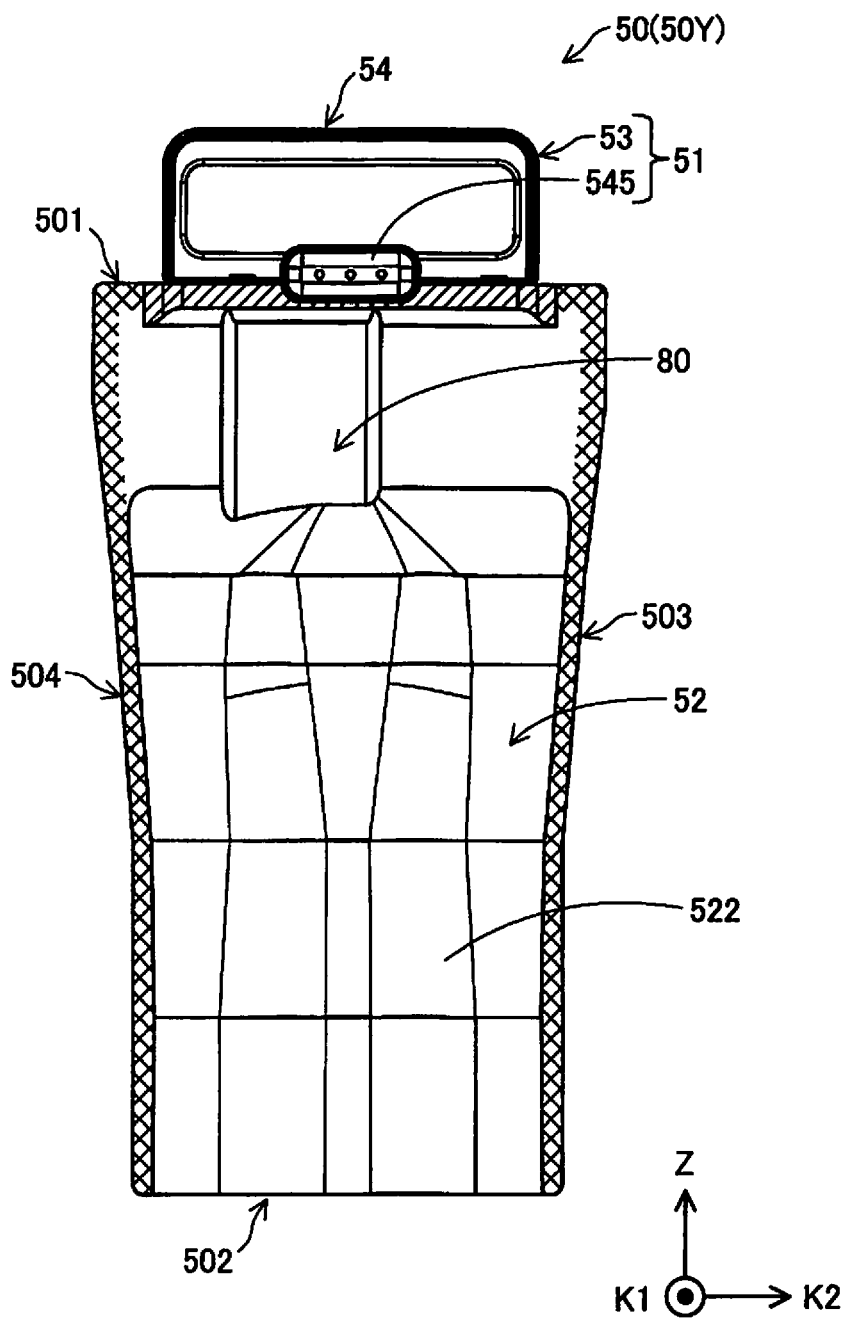
FIG. 14 is a back surface view of the liquid storage container.
Figure 15:
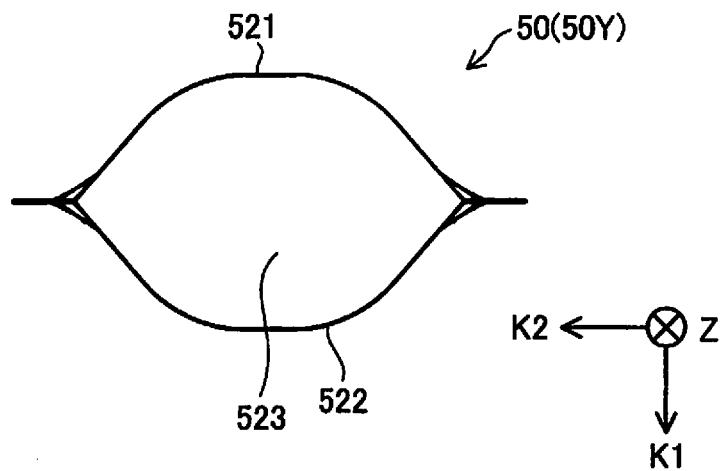
FIG. 15 is a bottom surface view of the liquid storage container.
Figure 16:
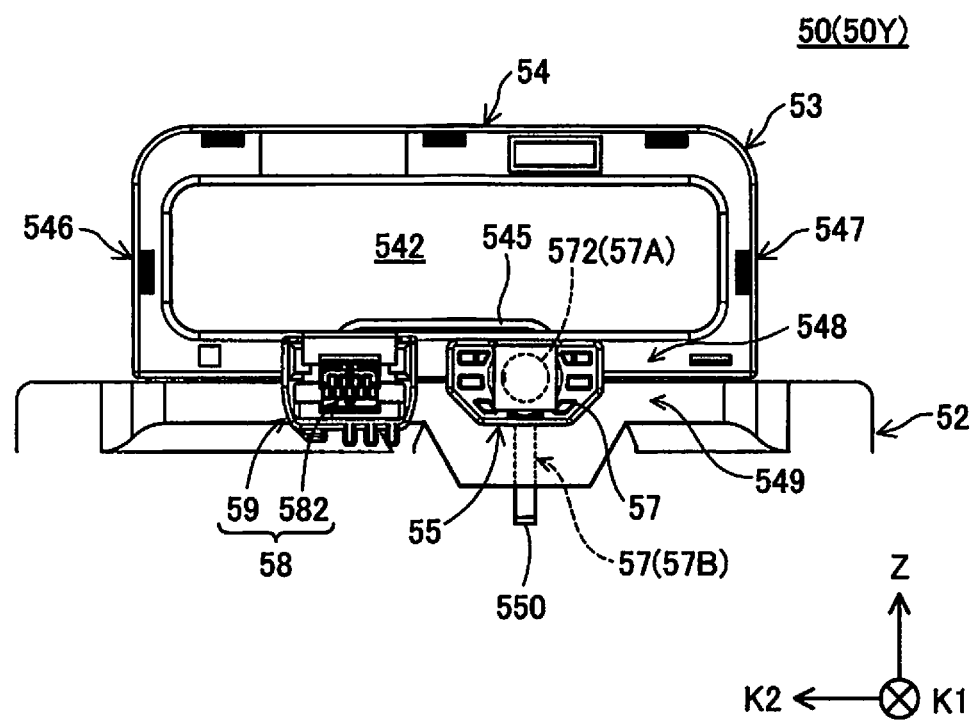
FIG. 16 is an enlarged partial view of FIG. 11.
Figure 17:
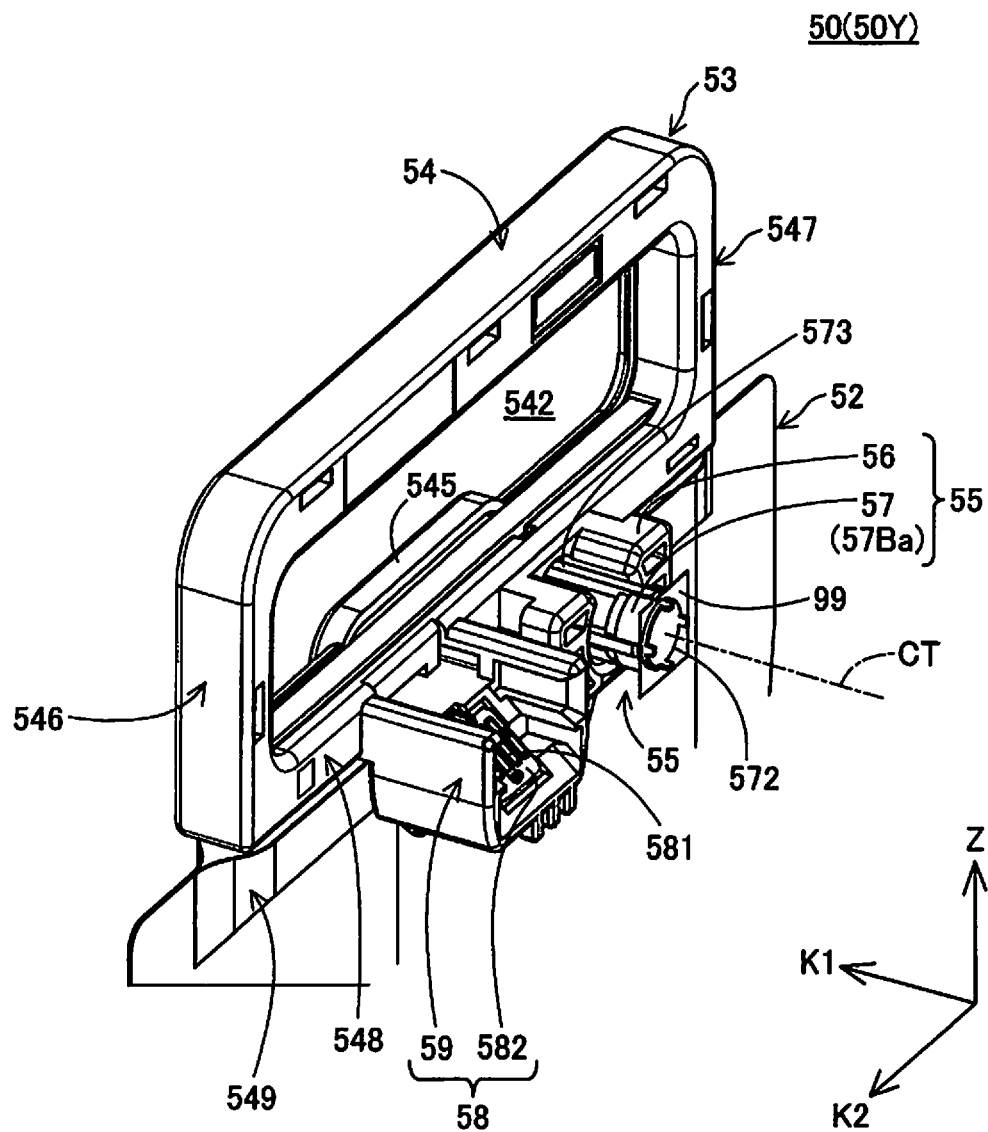
FIG. 17 is a first perspective diagram of the liquid storage container.

FIG. 11 is a front view of the liquid storage container 50. FIG. 12 is a first side surface view of the liquid storage container 50. FIG. 13 is a second side surface view of the liquid storage container 50. FIG. 14 is a back surface view of the liquid storage container 50. FIG. 15 is a bottom surface view of the liquid storage container 50. FIG. 16 is an enlarged partial view of FIG. 11. FIG. 17 is a first perspective view of the liquid storage container 50. FIG. 17 shows the vicinity of the operation member 53 of the liquid storage container 50.

With reference to FIG. 11 and later diagrams, the examples describe the configuration of the liquid storage container 50Y. However, the liquid storage containers 50C, 50M, 50K may or may not have the same configuration as liquid storage container 50Y.

The Z axis direction, the K1 axis direction, and the K2 axis direction can be defined as below. In the state in which the liquid storage container 50Y is connected to the printer 10, the Z axis direction is the gravity direction (perpendicular direction); the +Z direction is the upward gravity direction (upward perpendicular direction); and the –Z axis direction is the downward gravity direction (downward perpendicular direction). The K1 axis direction, which is the direction along the K1 axis, is parallel to the horizontal direction. In addition, the –K1 axis direction is the connection direction (direction of motion, first direction) of the liquid storage container 50 when the liquid storage container 50 is connected to the printer 10. In addition, the +K1 axis direction is the direction of removal when the liquid storage container 50 is removed from the printer 10. In this embodiment, the connection direction is the –K1 axis direction, which is the horizontal direction, but is not limited to this. The connection direction may be a direction that includes the horizontal direction component. In addition, the K2 axis direction is the direction orthogonal to the gravitational direction (Z axis direction) and the K1 axis direction.

As shown in FIG. 11, the liquid storage container 50Y is provided with a liquid storage portion 52, a filter unit 80, and a flow path forming member 70. In addition, the liquid storage container 50Y is provided with a storage portion support assembly 51 installed in the liquid storage portion 52. The liquid storage portion 52 can store ink as the liquid. The liquid storage portion 52 is installed in the storage portion support assembly 51 when the exterior surface was exposed. Namely, the liquid storage portion 52 is configured to enable visual confirmation from the outside without storing in a case. The liquid storage portion 52 reduces in volume as the stored ink decreases.

The liquid storage portion 52 has a first sheet 521 (FIG. 12), a second sheet 522 (FIG. 12), and a third sheet 523 (FIG. 15). The first to the third sheets 521 to 523 partition the space portion for storing the ink on the inside. As shown in FIG. 11, of the liquid storage portion 52, the side installed with the storage portion support assembly 51 is the side on one end 501 (one end portion, upper end). The side opposite the one end 501 is the other end 502 (other end portion, bottom end). In addition, in the liquid storage portion 52, one end side (+K2 axis direction side) is the side of the first side end 503 (end portion on the first side), and the other end side (–K2 axis direction side) is the side of the second side end 504 (end portion on the second side).

As shown in FIG. 11 to FIG. 14, in the mounted state of the liquid storage container 50Y, the first sheet 521 and the second sheet 522 configure the side surfaces of the liquid storage portion 52. As shown in FIG. 15, in the mounted state of the liquid storage container 50Y, the third sheet 523 configures the bottom surface of the liquid storage portion 52. The first sheet 521 and the second sheet 522 are arranged to be opposite. Mutually peripheral edge regions of the first sheet 521 and the second sheet 522 are welded. More specifically, the side portion of the one end 501, the side portion of the first side end 503, and the side portion of the second side end 504 are welded on the peripheral edge regions. To facilitate understanding, the cross-hatched sections in FIG. 11 and FIG. 14 are the welded portions of the first and second sheets 521, 522. In addition, the storage portion support assembly 51 is welded to one end 501 of the liquid storage portion 52 (more specifically, one end of the first and second sheets 521, 522). That is, the storage portion support assembly 51 is a member that is capable of being installed in one end 501 of the liquid storage portion 52. In order to facilitate understanding, single line hatching in FIG. 11 and FIG. 14 is applied to the welded portions of the storage portion support assembly 51 and the first and second sheets 521, 522.

As shown in FIG. 15, portions of the peripheral edge regions of the third sheet 523, the first sheet 521, and the second sheet 522 are welded. Thus, the liquid storage portion 52 of this embodiment is a type in which the three sheets 521, 522, 523 are attached by welding (that is, a pouch type having a bottom surface).

The first to third sheets 521 to 523 are members with flexibility. The materials (material quality) of the first to the third sheets 521 to 523 are, for example, polyethylene terephthalate (PET), nylon, polyethylene, and the like. In addition, a stacked layer structure having a plurality of stacked layers of a film configured from these materials may be used to form the first to the third sheets 521 to 523. In this stacked layer structure, for example, the outer layer may be formed from PET or nylon, which has superior shock resistance, and the inner layer may be formed from polyethylene, which has superior ink resistance. Furthermore, a film of deposited aluminum may be one structural member of the stacked layer structure. Thus, the gas barrier characteristic can be improved. For example, the density changes can be suppressed in the ink stored in the liquid storage portion 52. Thus, the material quality of the liquid storage portion 52 can be freely set.

In addition, the shape and the size of the liquid storage portion 52 can each be freely set. For example, the liquid storage portion 52 that stores black ink may have a larger volume (size) than the liquid storage portion 52 storing the inks of the other colors (e.g., cyan). In addition, the liquid storage portion 52 was a type in which the first to the third sheets 521 to 523 in this embodiment were attached by welding, but may be a type in which the third sheet 523 is omitted, and the first and second first sheets 521, 522 are attached by welding (the so-called, pillow-type). As described above, the liquid storage portion 52 and the storage portion support assembly 51 are separate members. Thus, while the storage portion support assembly 51 is the same component, the type of the liquid storage portion 52 can be easily changed (shape, size, materials). That is, the degrees of design freedom can be increased because the shape, size, and materials of the liquid storage portion 52 can be set to correspond to the properties and mass of the liquid stored in the liquid storage portion 52.

As shown in FIG. 11, the flow path forming member 70 is arranged inside of the liquid storage portion 52. The flow path forming member 70 is a tube. The interior of the flow path forming member 70 has an introduction flow path 702 (FIG. 10B) through which ink can flow. The flow path forming member 70 extends in the Z axis direction. The connection portion 70e2 positioned on the one end side of the flow path forming member 70 is connected to the filter unit 80. The introduction portion 70e1 at the other end side of the flow path forming member 70 is an opening near the bottom end 502 in the liquid storage portion 52. Thus, the introduction portion 70e1 introduces the ink in the liquid storage portion 52 into the flow path forming member 70 at a position further separated from the filter unit 80 than the connection portion 70e2. The introduction portion 70e1 is positioned lower in the downward gravity direction than the connection portion 70e2.

The filter unit 80 is arranged inside of the liquid storage portion 52. One end portion of the filter unit 80 is connected to the liquid supply portion 57 to be described later. The other end side is connected to the flow path forming member 70. The filter unit 80 has a filtering function and a degassing function. The filtering function is achieved by the filter chamber 84. The filtering function is the function of capturing the foreign matter present in the ink of the liquid storage portion 52 from the liquid storage portion 52 to the printer 10. The degassing function is the function of removing air bubbles (gases) in the ink of the liquid storage portion 52. The detailed configuration of the filter unit 80 will be described later.

As shown in FIG. 11, the storage portion support assembly 51 is provided with an operation member 53 (handle portion), a liquid supply unit 55, and a substrate unit 58. The operation member 53 is a frame member having an opening in the K1 axis direction. As shown in FIG. 14, the operation member 53 has a gripping portion 54 positioned at the end portion on the +Z axis direction side and a pushing portion 545 positioned at the end portion on the −Z axis direction side. The gripping portion 54 is the portion for the user to support (grip) the liquid storage container 50. The gripping portion 54 extends along the K2 axis direction.

When the liquid storage container 50 is connected to the printer 10, the pushing portion 545 is pushed by the user. That is, the pushing portion 545 is a portion that is pushed manually. The pushing portion 545 pushes on the −K1 axis direction (first direction) side to move the movable support structure 40 (FIG. 8) set by the liquid storage container 50 to the −K1 axis direction side. The pushing portion 545 is provided on the side opposite the side where the liquid supply unit 55 and the substrate unit 58 in the operation member 53 are provided. The pushing portion 545 is installed to project out from the operation member 53 to the outside (+K1 axis direction). Thus, the pushing portion 545 and the other portions can be easily distinguished.

As shown in FIG. 11, the liquid supply unit 55 and the substrate unit 58 are provided at the respective end portion on the −Z axis direction side of the operation member 53. The liquid supply unit 55 and the substrate unit 58 are arranged aligned in the K2 axis direction. The liquid supply unit 55 has a function to supply the ink stored in the liquid storage portion 52 to the outside (e.g., liquid introduction portion 362 in FIG. 5). The substrate unit 58 has a function to electrically connect to the apparatus side terminals 381 of the contact point mechanism 38. The liquid supply unit 55 and the substrate unit 58 are provided to project out from the operation member 53 to the outside (−K1 axis direction). The projection directions of the liquid supply unit 55 and the substrate unit 58 are the same. The projection direction of the substrate unit 58 and the projection direction of the liquid supply unit 55 do not have to be the same, and may be approximately parallel. In addition, the substrate unit 58 and the liquid supply unit 55 project from the operation member 53 toward the same side (−K1 axis direction side) with respect to the operation member 53.

As shown in FIG. 16 and FIG. 17, in addition to the gripping portion 54, the operation member 53 is provided with a first connection portion 546, a second connection portion 547, a base portion 548, and an installation portion 549. The liquid storage portion 52 is installed by welding to the installation portion 549.

Each of the gripping portion 54, the first connection portion 546, the second connection portion 547, and the base portion 548 has a bar shape. The frame member is formed from the gripping portion 54, the first connection portion 546, the second connection portion 547, and the base portion 548.

As shown in FIG. 16, the base portion 548 extends along the K2 axis direction. The liquid supply unit 55 and the substrate unit 58 are installed in the base portion 548. That is, the liquid supply unit 55 and the substrate unit 58 are connected to each other via the base portion 548 of the operation member 53. Thus, the liquid supply unit 55 and the substrate unit 58 are connected to the actions of the base portion 548. The user can operate the actions of one member (base portion 548 in this embodiment) to operate the liquid supply unit 55 and the circuit substrate-holding portion 59 that are used to connect the liquid storage container 50 to the printer 10. Here, "connect" means to connect in order to linking together and operate the pair of members that are connected.

The installation portion 549 is positioned on the side opposite the side in which the gripping portion 54 is positioned to sandwich the base portion 548. The installation portion 549 is adjacent to the base portion 548. The installation portion 549 extends along the K2 axis direction. The installation portion 549 is the portion (joined portion) that is installed by welding one end 501 (FIG. 11) of the liquid storage portion 52.

As shown in FIG. 16 and FIG. 17, the liquid supply unit 55 is provided with a liquid supply portion 57 and a supply portion side support portion 56. However, the supply portion side support portion 56 is configured as a separate body from the liquid supply portion 57, and forms a minute gap with the liquid supply portion 57.

The liquid supply portion 57 distributes the ink stored in the liquid storage portion 52 in the printer 10. That is, the interior of the liquid supply portion 57 is provided with the liquid supply flow path 570 to supply the ink in the liquid storage portion 52 to the printer 10. The liquid supply flow path 570 (liquid supply portion 57) has an inflow port 550 at the upstream end (FIG. 16) and a liquid supply port 572 at the downstream end (FIG. 17). The inflow port 550 side of the liquid supply portion 57 is connected to the filter unit 80. The liquid supply port 572 distributes the ink stored in the liquid storage portion 52 to the outside (printer 10). In the liquid supply portion 57, a projecting member 57Ba forming the second supply flow path 57B (FIG. 17) extends in the first direction (−K1 axis direction), which is the direction intersecting the gravity direction (Z axis direction) from the operation member 53. In the mounted state of the liquid storage container 50, the liquid supply port 572 inserts the liquid introduction portion 362 (FIG. 5). The liquid supply port 572 is defined by a flat plane (plane defined by the Z axis direction and the K2 axis direction).

As shown in FIG. 17, the liquid supply portion 57 (specifically, projecting member 57Ba) provides the center shaft CT. The center shaft CT is parallel to the K1 axis direction. The projecting member 57Ba is a cylindrical member (annular member) that extends along the K1 axis direction (direction of the center shaft CT).

In the unused state of the liquid storage container 50, the liquid supply port 572 is covered by a film 99. By doing this, before the liquid storage container 50 is installed to the detachable unit 30 (FIG. 5), leakage of ink from the liquid supply port 572 to the outside can be suppressed. The film 99 is torn by the liquid introduction portion 362 (FIG. 5) when the liquid storage container 50 is installed in the detachable unit 30.

The supply portion side support portion 56 positions to some degree the liquid storage portion 52 including the liquid supply port 572 with respect to the printer 10 when the liquid storage container 50 is connected to the printer 10. The supply portion side support portion 56 has a concave form with the opening on the +Z axis direction side. The supply portion side support portion 56 encloses the portions excluding the Z axis direction (upward gravity direction) of the surroundings centered on the center shaft CT of the liquid supply portion 57. The supply portion side support portion 56 is arranged at a position adjacent to the liquid supply port 572 of the liquid supply portion 57. When the operation member 53 is formed from materials that are difficult to deform, the supply portion side support portion 56 may be provided at a position somewhat separated from the liquid supply port 572 of the operation member 53.

The supply portion side support portion 56 is arranged at a specified position of the movable support structure 40 when the liquid storage container 50 is connected to the printer 10. Thus, by hitting the movable support structure 40 and the supply portion side support portion 56, the motion of the liquid supply portion 57 is restricted, and the liquid storage container 50 is positioned to some degree. In addition, when the liquid storage container 50 is set in the movable support structure 40 of the detachable unit 30, the supply portion side support portion 56 is supported by the movable support structure 40 so that the liquid storage portion 52 hangs lower by its own weight on the downward gravity direction side than the gripping portion 54.

As shown in FIG. 16 and FIG. 17, the substrate unit 58 is provided with a circuit substrate 582 and a circuit substrate-holding portion 59. The circuit substrate-holding portion 59 holds the circuit substrate 582. The circuit substrate-holding portion 59 is installed by integrating with the operation member 53. In this embodiment, the circuit substrate-holding portion 59 is created by integral molding with the operation member 53, and is provided by integrating with the operation member 53. Here, "provided by integrating with" means that the circuit substrate-holding portion 59 is provided in the operation member 53 in order to be linked to the actions of the operation member 53. In another embodiment, by attaching the circuit substrate-holding portion 59 by welding to the operation member 53, the circuit substrate-holding portion 59 may be provided by integrating with the operation member 53.

Figure 19:
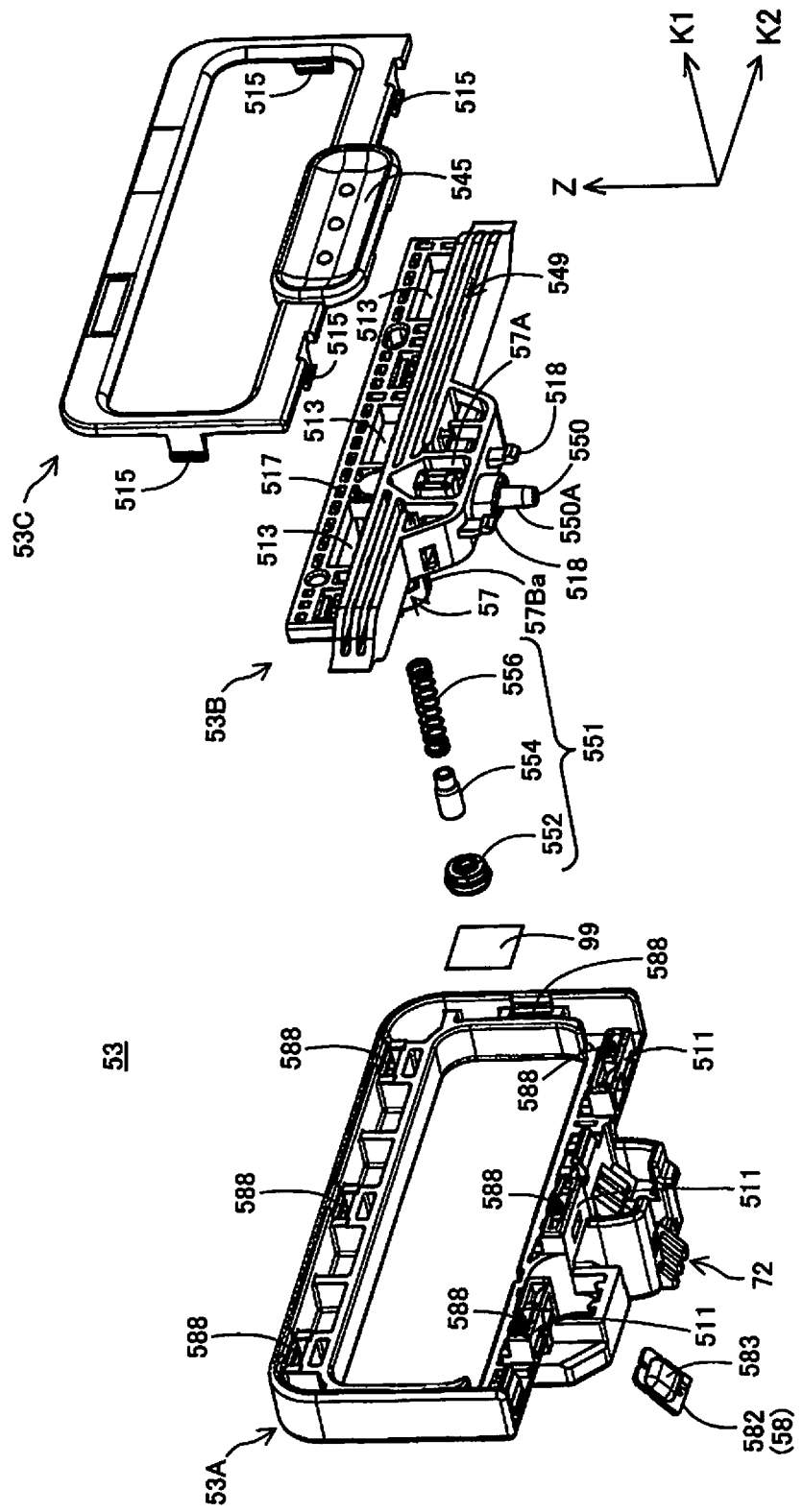
FIG. 19 is a second exploded perspective diagram of the operating members.

As shown in FIG. 17, the circuit substrate 582 has a plurality of liquid storage container-side terminals 581 provided on the front surface and a memory apparatus 583 installed on the back surface (FIG. 19).

Nine liquid storage container-side terminals 581 are installed. Each liquid storage container-side terminal 581 is electrically connected in the mounted state by contact with the corresponding apparatus side terminal 381 (FIG. 5). The memory apparatus 583 of the circuit substrate 582 stores information related to the liquid storage container 50 (e.g., amounts of remaining inks and ink colors).

A-4-2. Configuration of Operation Member 53

Figure 18:
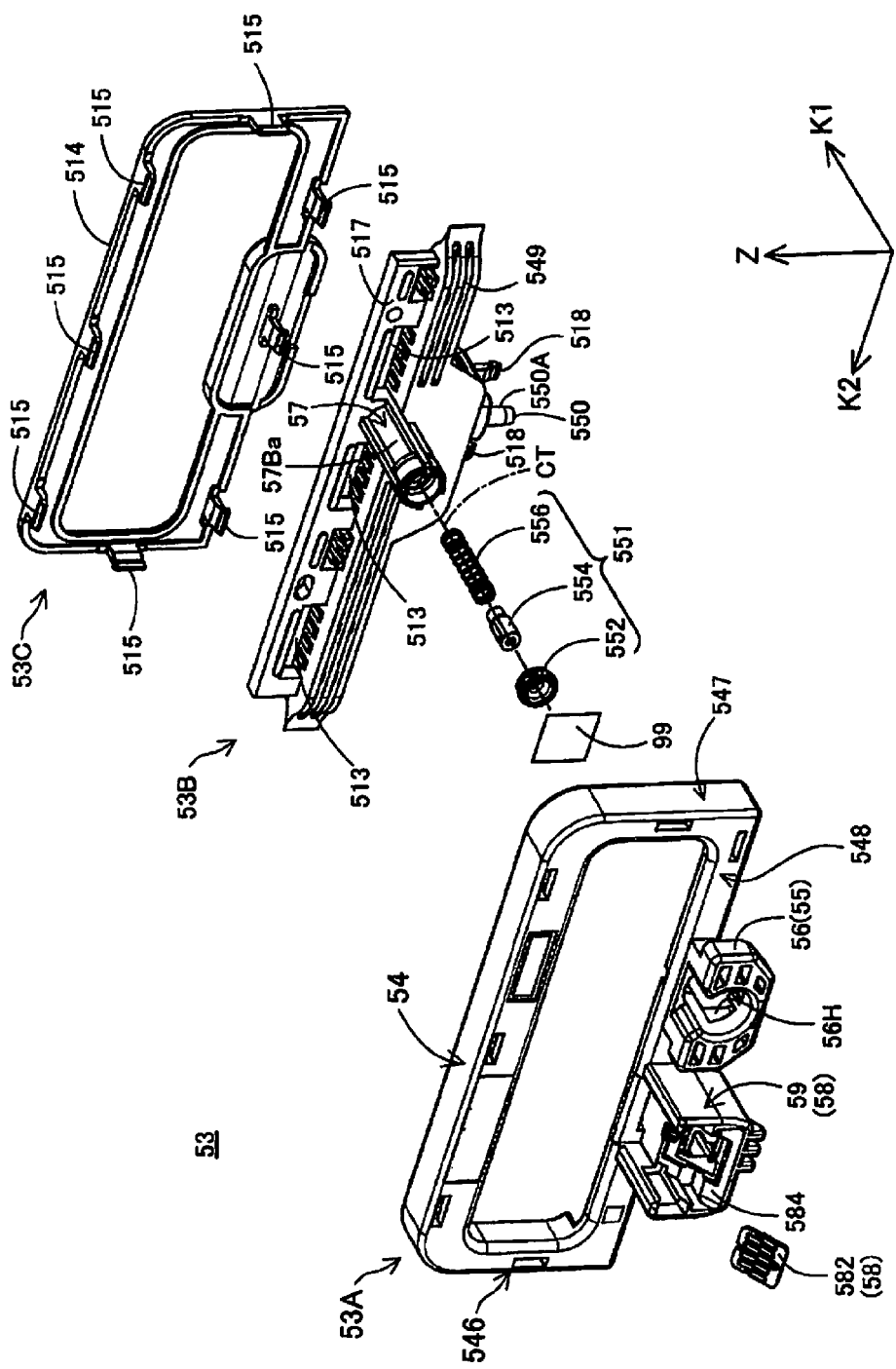
FIG. 18 is a first exploded perspective diagram of the operating members.

FIG. 18 is a first exploded perspective view of the operation member 53. FIG. 19 is a second exploded perspective view of the operation member 53. FIG. 19 is a front view of the operation member 53.

As shown in FIG. 18 and FIG. 19, the operation member 53 (handle portion) is provided with a first member 53A, a second member 53B, and a third member 53C. The first member 53A to the third member 53C are combined to form the operation member 53. More specifically, each member 53A and 53B are combined so that the first member 53A and the third member 53C sandwich the second member 53B. Each of first member 53A to third member 53C is formed by integral molding of materials such as composite resins.

As shown in FIG. 18, the first member 53A includes the gripping portion 54. The form of the first member 53A is a frame. The first member 53A is a plate-like member along the plane orthogonal to the K1 axis direction (direction of the center shaft CT). At the base portion 548 in the first member 53A, the supply portion side support portion 56 and the circuit substrate-holding portion 59 are connected by integral molding. A through hole 56H of the supply portion side support portion 56 is inserted so that the projecting member 57Ba of the second member 53B projects out. As above, the first member 53A of the operation member 53 is also referred to as "operation member 53A."

As shown in FIG. 19, the first member 53A has three engaging portions 511 that engage with the second member 53B. The engaging portions 511 are installed in the base portion 548. The shape of the engaging portion 511 is a roughly rectangular solid. The engaging portion 511 is a convex portion that projects from the base portion 548 to the +K1 axis direction side.

In addition, the first member 53A is provided with eight member engaging portions 588 (only seven are shown in the drawing) in order to link (connect) the first member 53A to the third member 53C by engaging with the third member 53C. The member engaging portion 588 has a concave shape.

As shown in FIG. 18 and FIG. 19, the liquid supply portion 57 is provided by integral molding in the second member 53B. In addition, the installation portion 549 (joining portion) is provided by integral molding in the second member 53B. As shown in FIG. 19, the liquid storage portion 52 is installed by welding in the installation portion 549 provided in the second member 53B to form a portion of the first supply flow path 57A (FIG. 10A). As described above, because the second member 53B is the member that forms the liquid supply portion 57, the second member 53B can also be referred to as the "liquid supply portion 57."

In addition, the second member 53B has three engaging portions 513 to install the first member 53A in the second member 53B by engaging with the engaging portions 511. The engaging portions 513 are through holes that pierce in the K1 axis direction. The engaging portions 511 are inserted into the engaging portions 513, which are the corresponding through holes, to install the second member 53B into the first member 53A. That is, the portion 517 that provides the engaging portions 513 is also referred to as the "projection portion 517" that projects to the outside of the liquid storage portion 52 (FIG. 11) from the installation portion 549. By engaging the engaging portions 511 of the first member 53A with the engaging portions 513 of the projection portion 517, the first member 53A is connected to the installation portion 549.

In addition, the second member 53B has a supply portion-side engagement portion 518 and an end member 550A. The supply portion-side engagement portion 518 locks to the filter unit 80. Two supply portion-side engagement portions 518 are provided. The end member 550A has a cylindrical shape, and a portion of the first supply flow path 57A is formed in the interior thereof. One end of the end member 550A forms an inflow port 550. The end member 550A is pushed to the filter unit 80.

As shown in FIG. 18 and FIG. 19, the third member 53C includes the pushing portion 545. The shape of the third member 53C is a frame that corresponds to the shape of the first member 53A. The third member 53C is a plate-like member along the plane orthogonal to the K1 axis direction (direction of the center shaft CT). Eight engaging portions 515 are provided on the first side 53fa of the third member 53C. The engaging portions 515 engage with the member engaging portions 588 shown in FIG. 19 to connect the first member 53A and the third member 53C.

A valve mechanism 551 for opening and closing the liquid supply flow path 570 (FIG. 10B) is arranged inside of the liquid supply portion 57 (more specifically, the projecting member 57Ba). The valve mechanism 551 is provided with a valve seat 552, a valve body 554, and a spring 556. The valve seat 552, the valve body 554, and the spring 556 are arranged in that order from the liquid supply port 572 of the liquid supply portion 57.

The valve seat 552 is a roughly annular member. For example, the valve seat 552 is formed from an elastic body, such as rubber or elastomer. The valve seat 552 is pushed in the liquid supply portion 57. The valve body 554 is a roughly columnar member. The valve body 554 plugs the hole (valve hole) formed in the valve seat 552 when the liquid storage container 50 is mounted in the detachable unit 30. The spring 556 is a compressed coil spring. The spring 556 orients the valve body 554 toward the valve seat 552 side. In the mounted state of the liquid storage container 50, the liquid introduction portion 362 (FIG. 7) pushes the valve body 554 to the supply connection portion 573 side, and the valve body 554 moves to the supply connection portion 573 side. Thus, the valve body 554 is separated from the valve seat 552, and the valve mechanism 551 enters the open state. When the valve mechanism 551 is in the open state, the ink stored in the liquid storage portion 52 (FIG. 12) can flow to the outside.

A-4-3. Configuration of the Filter Unit

Figure 20:
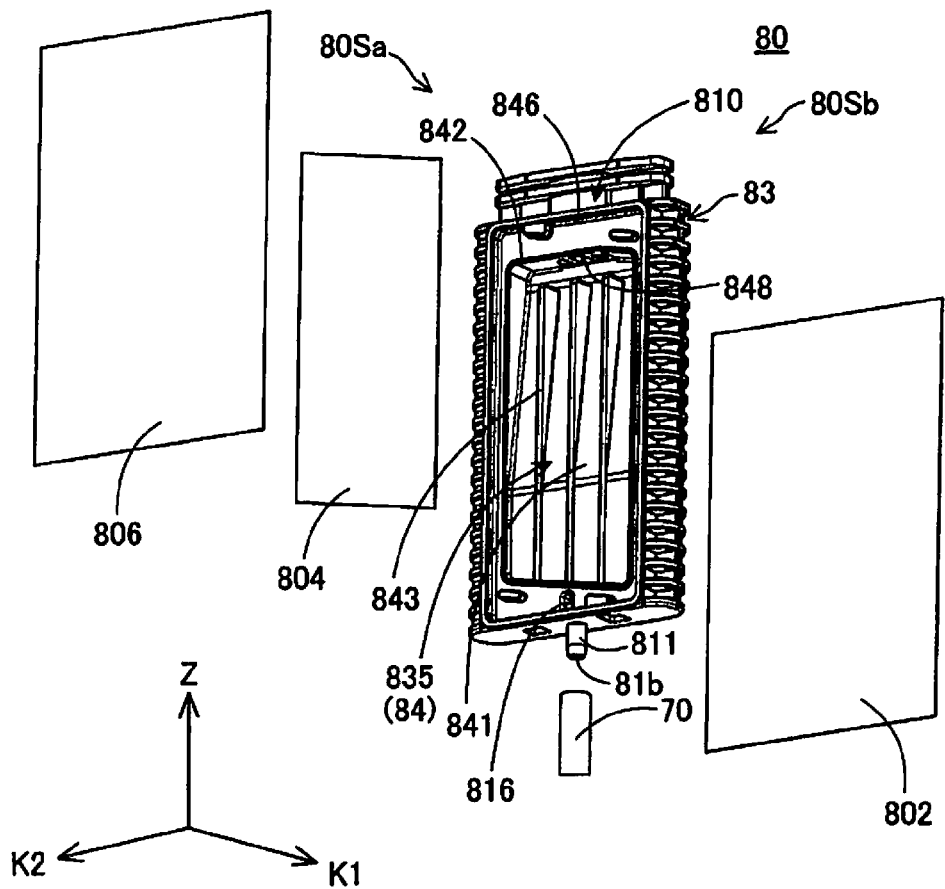
FIG. 20 is an exploded perspective diagram of the filter unit.
Figure 21:
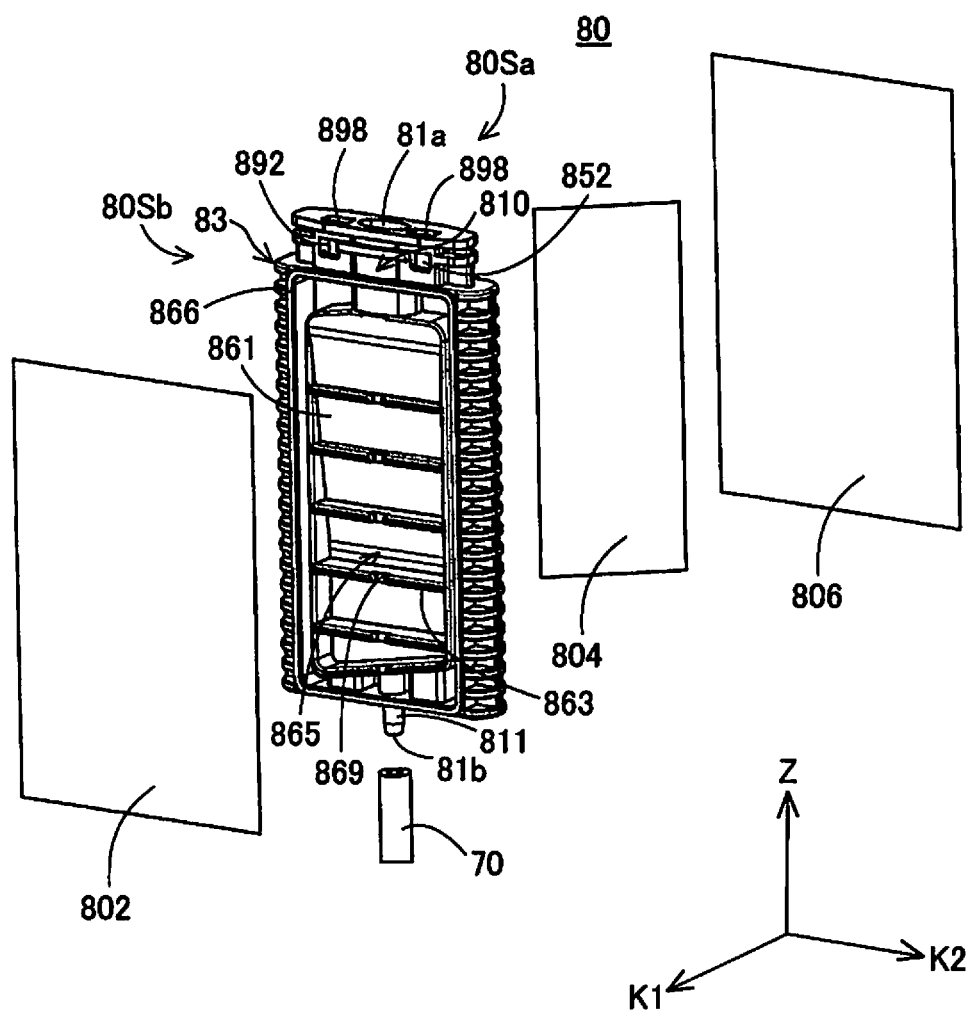
FIG. 21 is an exploded perspective diagram of the filter unit.
Figure 22:
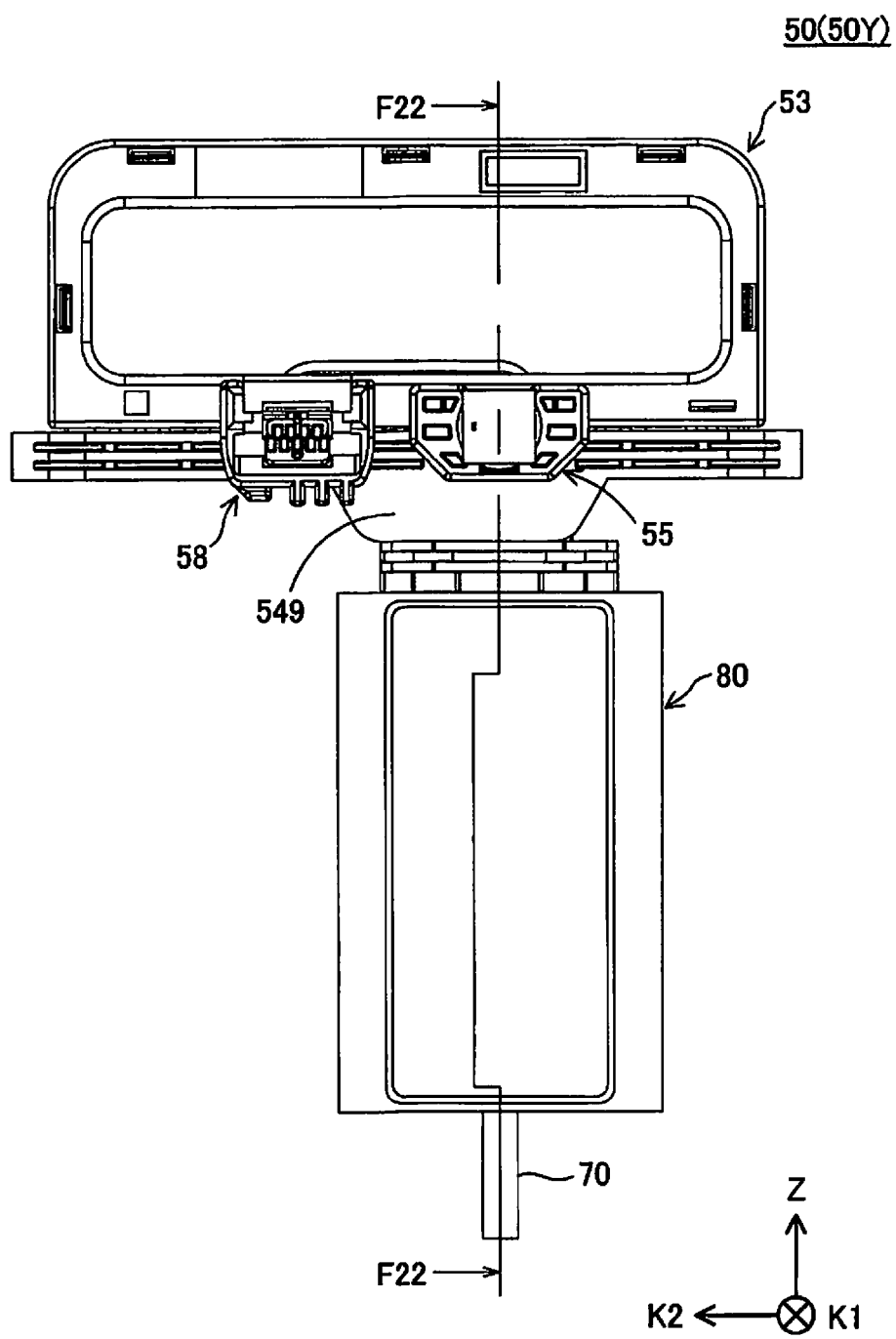
FIG. 22 is a diagram for explaining the liquid storage container.
Figure 23:
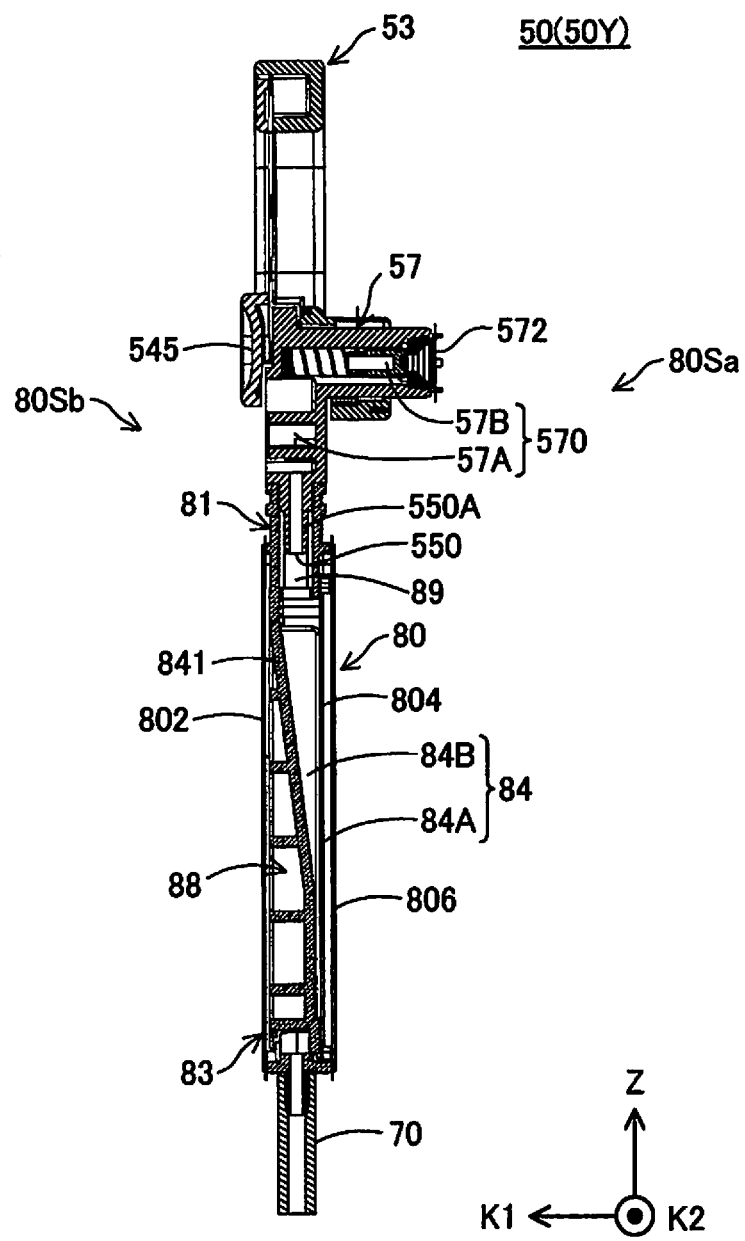
FIG. 23 is a cross-sectional view along F22-F22 in FIG. 22.
Figure 24:
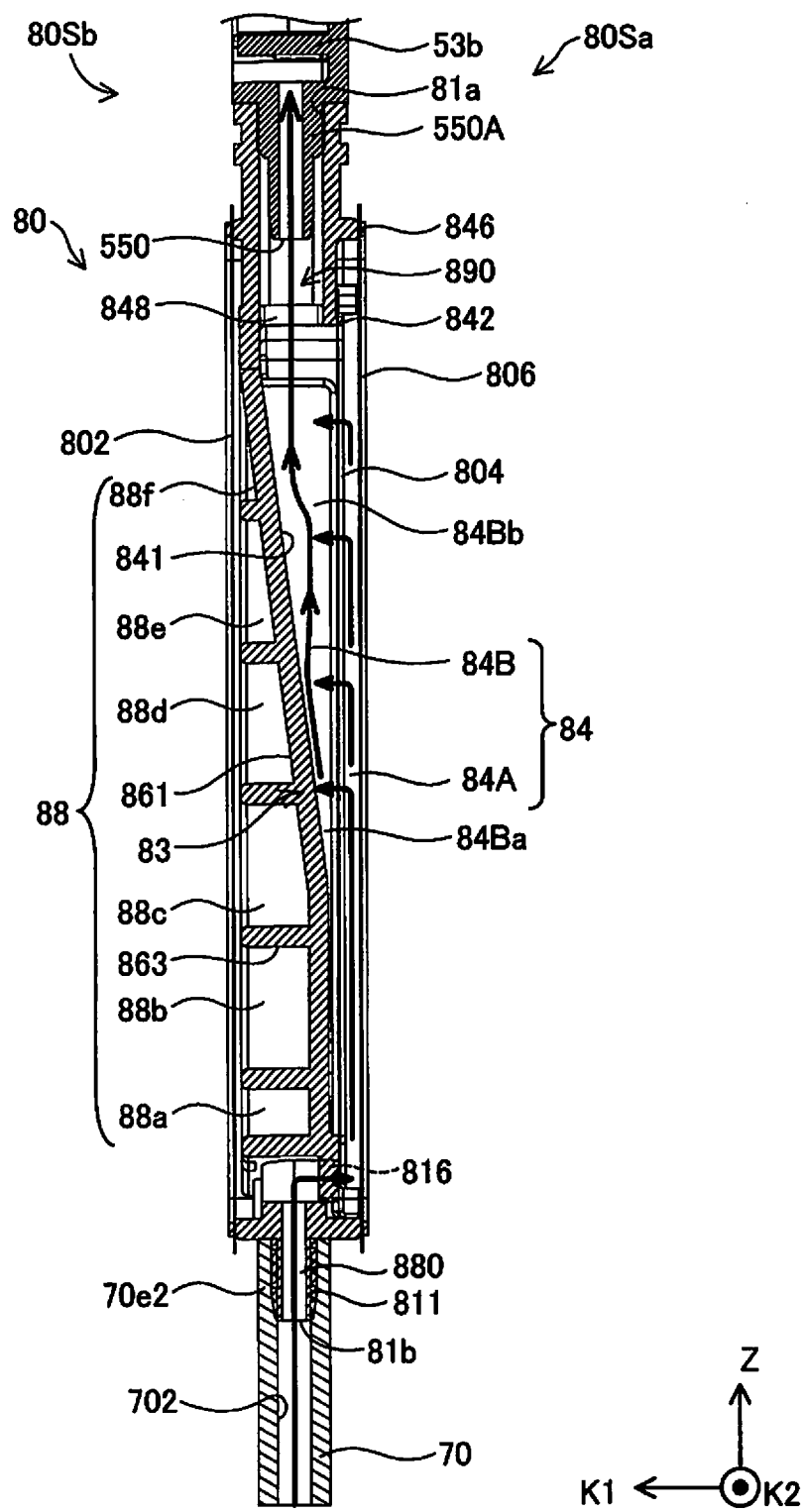
FIG. 24 is an enlarged partial view of FIG. 23.

FIG. 20 is an exploded perspective view of the filter unit 80. FIG. 21 is an exploded perspective view of the filter unit 80. FIG. 22 is a diagram for explaining the liquid storage container 50Y. FIG. 23 is a cross-sectional view along F22-F22 in FIG. 22. FIG. 24 is a partial enlarged view. As shown in FIG. 20 and FIG. 21, the side in the −K1 axis direction of the filter unit 80 is referred to as the first side 80Sa, and the side in the +K1 axis direction is referred to as the second side 80Sb.

As shown in FIG. 20, the filter unit 80 is provided with a frame 83, a filter 804, a filter chamber film 806, and a low pressure chamber film 802. As shown in FIG. 21, the frame 83 has a first opening 81a formed in the end portion on the +Z axis direction side, and a second opening 81b formed in the end portion on the −Z axis direction side. The first opening 81a passes through the liquid supply flow path 570 (FIG. 10B), which is the internal flow path of the liquid supply portion 57. The second opening 81b connects to the outside of the filter unit 80 in the liquid storage portion 52. The first opening 81a is the upstream end of the flow path (connection flow path 800) formed in the filter unit 80. The second opening 81b is the downstream end of the flow path (connection flow path 800) formed in the filter unit 80. Ink in the liquid storage portion 52 that passed through the flow path forming member 70 flows into the filter unit 80 through the second opening 81b. Ink that passed through the filter unit 80 flows to the outside of the filter unit 80 via the first opening 81a.

The filter 804 is permeated by ink, but is not permeated by foreign matter (solid matter) larger than a specified size. That is, the filter 804 captures the foreign matter in the ink. The filter chamber film 806 and the low pressure chamber film 802 are permeated by gas, but are not permeated by ink, which is a liquid. In this embodiment, the filter chamber film 806 and the low pressure chamber film 802 are formed by using the same materials.

The frame 83 has a roughly rectangular solid shape. The frame 83 is formed from a composite resin. Preferably, the frame 83 is formed from a material having high permeability to gas. A filter chamber forming portion 835 is formed on the first side 80Sa of the frame 83. The filter chamber forming portion 835 is a concave portion. When viewed from the first side 80Sa, the exterior shape of the filter chamber forming portion 835 is roughly rectangular. The filter chamber forming portion 835 has a bottom surface 841 forming the bottom of the concave portion, ribs 843 extending to the first side 80Sa from the bottom surface 845, a bank portion 842 that is the end surface of the inner wall that surrounds the bottom surface 841, and a film mounting portion 846 that surrounds the entire periphery of the bank portion 842. The film mounting portion 846 projects further to the first side 80Sa side than the bank portion 842.

The filter chamber forming portion 835 forms the filter chamber 84 together with the filter 804 and the filter chamber film 806. Specifically, the filter 804 is affixed to the bank portion 842 of the filter chamber forming portion 835, and the filter chamber film 806 is affixed to the film mounting portion 846 to form the filter chamber 84 shown in FIG. 24. The filter 804 is hermetically sealed to cover the opening delineated by the bank portion 842. The filter chamber film 806 is hermetically sealed to cover the opening delineated by the film mounting portion 846. Thus, the filter 804 is arranged in the closed space formed by the frame 83 and the filter chamber film 806.

As shown in FIG. 24, the filter chamber 84 has a first chamber 84A and a second chamber 84B partitioned by the filter 804. The first chamber 84A is formed from the frame 83, the filter 804, and the filter chamber film 806. The second chamber 84B is formed from the frame 83 and the filter 804. The first chamber 84A and the second chamber 84B are partitioned by the filter 804 in such a manner that the chambers 84A and 84B can be in ink communication with each other through the filter 804. The first chamber 84A and the second chamber 84B are adjacent.

The ink that flowed through the first chamber 84A flows through the filter 804 into the second chamber 84B. The cross-sectional area of the flow path of the first chamber 84A is approximately the same. On the other hand, the cross-sectional area of the flow path of the second chamber 84B is configured so that the area on the upstream side 84Ba is smaller than that on the downstream side 84Bb. In this embodiment, the bottom surface 841 facing the filter 804 is inclined to be recede from the filter 804 toward the downstream side (+Z axis direction side) of the second chamber 84B. Thus, the cross-sectional area of the flow path of the upstream side 84Ba is smaller than the cross-sectional area of the downstream side 84Bb. The portion in which the cross-sectional areas of the flow paths become roughly the same may be present from the upstream side 84Ba to the downstream side 84Bb.

As shown in FIG. 20 and FIG. 24, the ink in the liquid storage portion 52 flows through the opening 816 into the filter chamber 84. The ink that passed through the filter chamber 84 passes through the opening 848 and flows into the second flow path 890.

As shown in FIG. 21, a low pressure chamber forming portion 865 is formed on the second side 80Sb of the frame 83. The low pressure chamber forming portion 865 is a concave portion. When viewed from the second side 80Sb, the low pressure chamber forming portion 865 is roughly rectangular. The low pressure chamber forming portion 865 has a bottom surface 861 forming the bottom of the concave portion, a partition wall 863 that extends from the bottom surface 861 to the second side 80Sb, and a film mounting portion 866 that defines the opening opposite the bottom surface 861. The film mounting portion 866 is the end surface of the wall portion forming the enclosure of the low pressure chamber forming portion 865. As shown in FIG. 24, the partition wall 863 divides the low pressure chamber 88 into a plurality of sectional chambers 88a to 88f. As shown in FIG. 21, a notch 869 is formed in the end surface of the second side 80Sb of the partition wall 863. The sectional chambers 88a to 88f, which are adjacent to each other as shown in FIG. 24, are connected by this notch 869.

The low pressure chamber forming portion 865 forms the low pressure chambers 88 together with the low pressure chamber film 802. Specifically, the low pressure chamber 88 is formed by affixing the low pressure chamber film 802 to the film mounting portion 866 of the low pressure chamber forming portion 865. The low pressure chamber 88 is arranged independent of the connection flow path 800 (FIG. 10B) that includes the filter chamber 84. That is, the low pressure chamber 88 is not arranged in the connection flow path 800 and is arranged at a different position than the connection flow path 800. The low pressure chamber 88 is connected through the low pressure chamber film 802 to the interior of the liquid storage portion 52.

The low pressure chamber film 802 is hermetically affixed to close the opening formed in the partition by the film mounting portion 866. The low pressure chamber 88 has a lower pressure than atmospheric pressure. The low pressure chamber 88 is in a lower pressure state. The pressure of the low pressure chamber 88 becomes lower than atmospheric pressure by affixing the low pressure chamber film 802 to the film mounting portion 866 in a lower pressure environment. The low pressure chamber 88 does not have to be an airtight space if the pressure in the chamber is lower than atmospheric pressure.

The low pressure chamber film 802 is arranged to be in contact with the ink in the liquid storage portion 52. At least, in the state before the ink in the liquid storage container 50Y is exhausted (initial state), the region positioned on the outside of the filter unit 80 in the liquid storage portion 52 has a higher pressure than the low pressure chamber 88. Thus, air bubbles dissolved in the ink on the outside of the low pressure chamber 88 and air bubbles in the ink are in contact with the low pressure chamber film 802, permeate the low pressure chamber film 802, and move into the interior of the low pressure chamber 88. The air bubbles that moved into the low pressure chamber 88 are captured inside of the low pressure chamber 88. This type of low pressure chamber 88 absorbs air bubbles included in the ink in the liquid storage portion 52.

As shown in FIG. 24, the low pressure chamber 88 is adjacent to the filter chamber 84. In this embodiment, the low pressure chamber 88 is formed on the second side 80Sb of the frame 83; the filter chamber 84 is formed on the first side 80Sa of the frame 83; and the low pressure chamber 88 and the filter chamber 84 are adjacent. Also, in this embodiment, a portion of the low pressure chamber 88 and a portion of the filter chamber 84 are formed from a common member (frame 83). The low pressure chamber 88 is adjacent to the filter chamber 84, and gas in the ink surrounding the filter chamber 84 in the liquid storage portion 52 can be efficiently absorbed by the low pressure chamber 88. The low pressure chamber 88 absorbs the gas and is able to reduce the amount of gas in the ink flowing from the liquid storage portion 52 to the filter chamber 84. Thus, the possibility of air bubbles adhering to the filter 804 can be reduced; and the possibility of obstruction of ink distribution by the adherence of air bubbles to the filter 804 can be reduced. By doing this, the ink in the liquid storage portion 52 can be smoothly supplied to the printer 10.

As shown in FIG. 20, the filter unit 80 is also provided with a first opening forming member 810 arranged at the end portion on the +Z axis direction side of the frame 83 and a second opening forming member 811 that is arranged at the end portion on the −Z axis direction side of the frame 83.

As shown in FIG. 21, a first opening 81a is formed in the end surface on the +Z axis direction side of the first opening forming member 810. In addition, the first opening forming member 810 has a receiving portion 898 for receiving the supply portion-side engagement portion 518 (FIG. 19) and a portion-side engagement portion 892 that engages the supply portion-side engagement portion 518. Two each of the receiving portion 898 and the portion-side engagement portion 892 are provided to correspond to the number of supply portion-side engagement portions 518 (FIG. 19). The receiving portion 898 is a through hole, and the supply portion-side engagement portion 518 is inserted.

The second opening forming member 811 forms the second opening 81b in the end portion on the −Z axis direction side. As shown in FIG. 24, a portion of the first flow path 880 is formed in the interior of the second opening forming member 811. The second opening forming member 811 is connected to the connection portion 70e2 of the flow path forming member 70.

A-4-4. Installation of the Filter Unit 80 and the Second Member 53B

Figure 25:
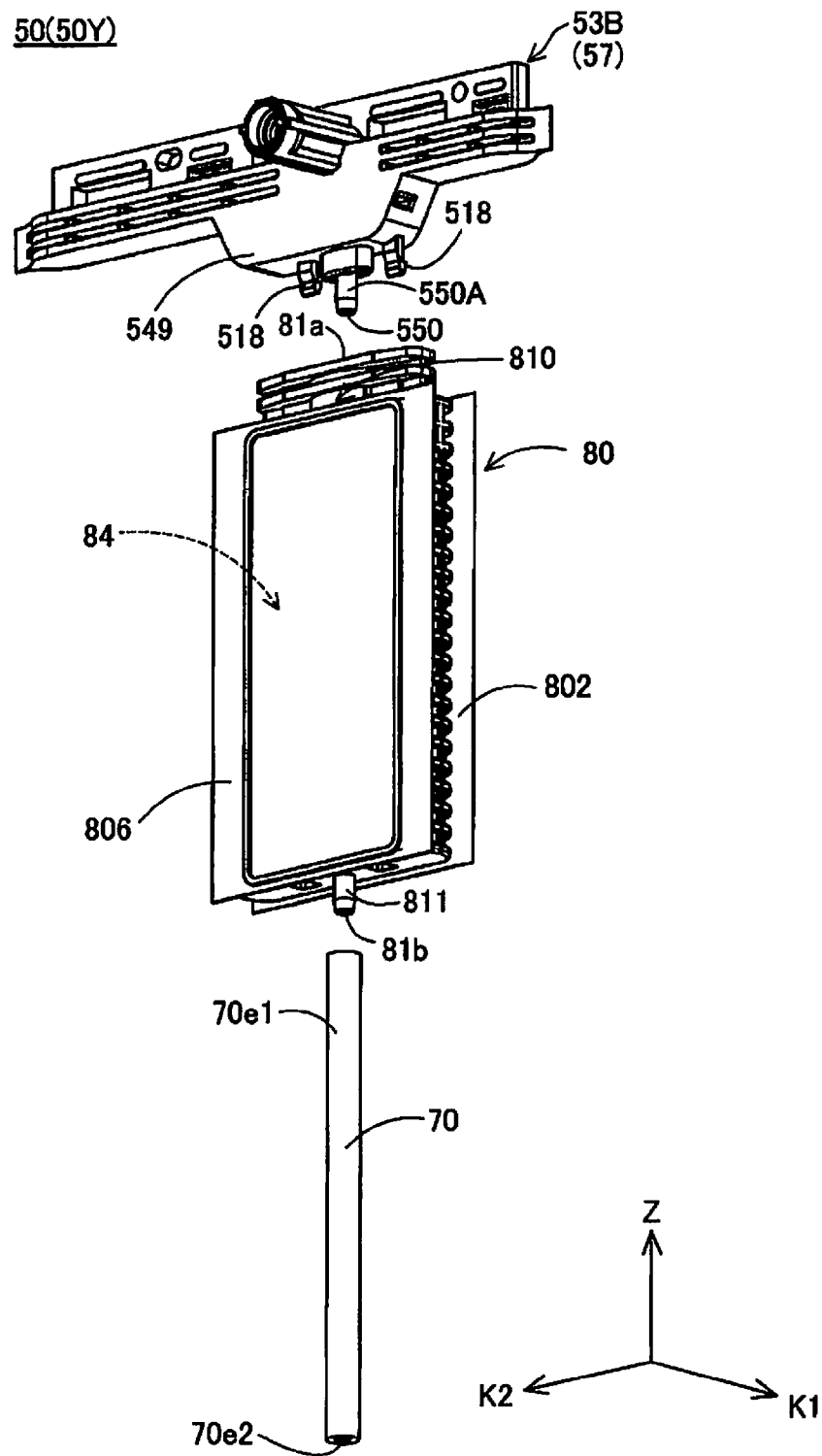
FIG. 25 is a diagram for explaining the mounting method of the filter unit.
Figure 26:
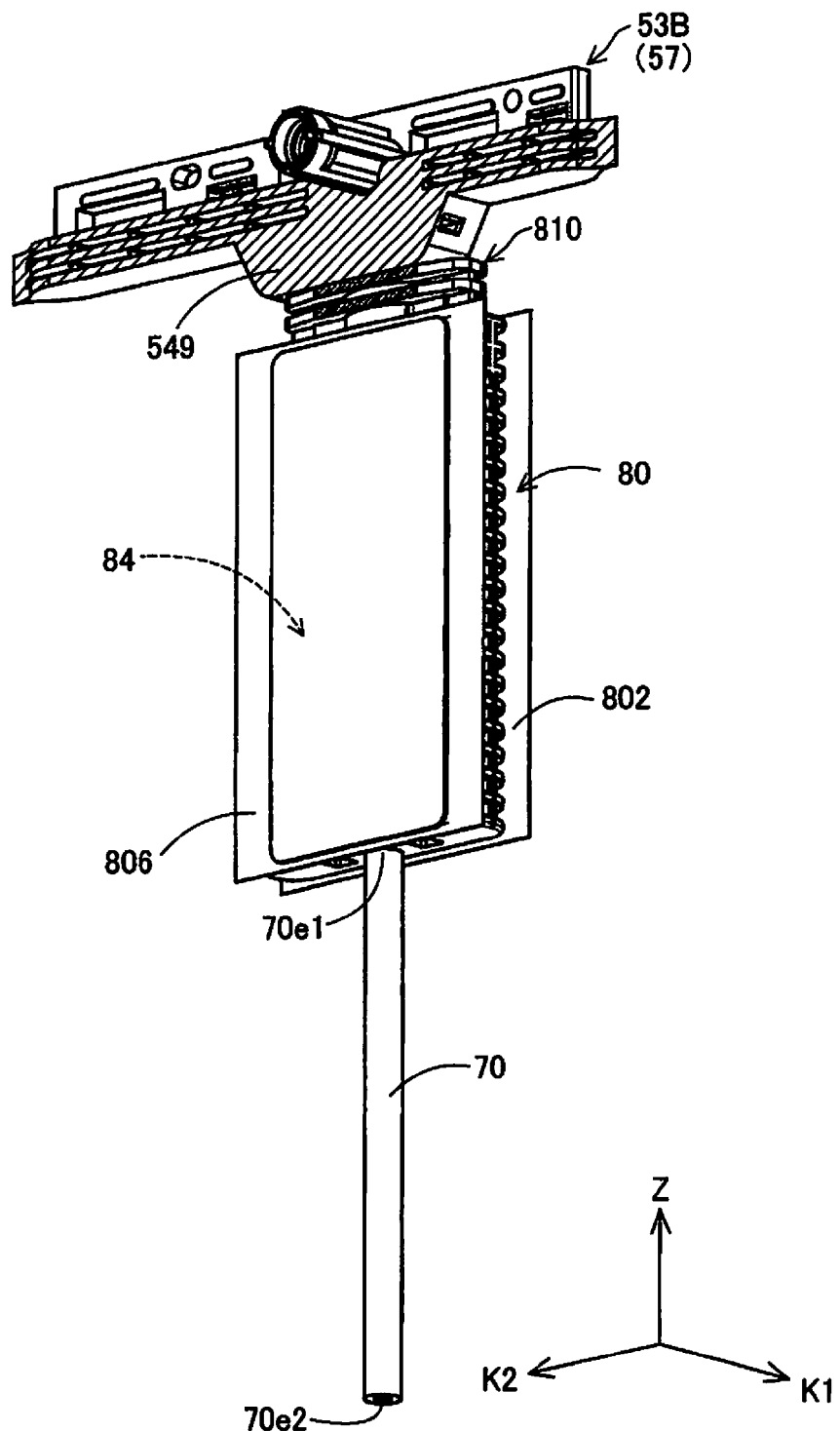
FIG. 26 is a diagram for explaining the mounting method of the filter unit.
Figure 27:
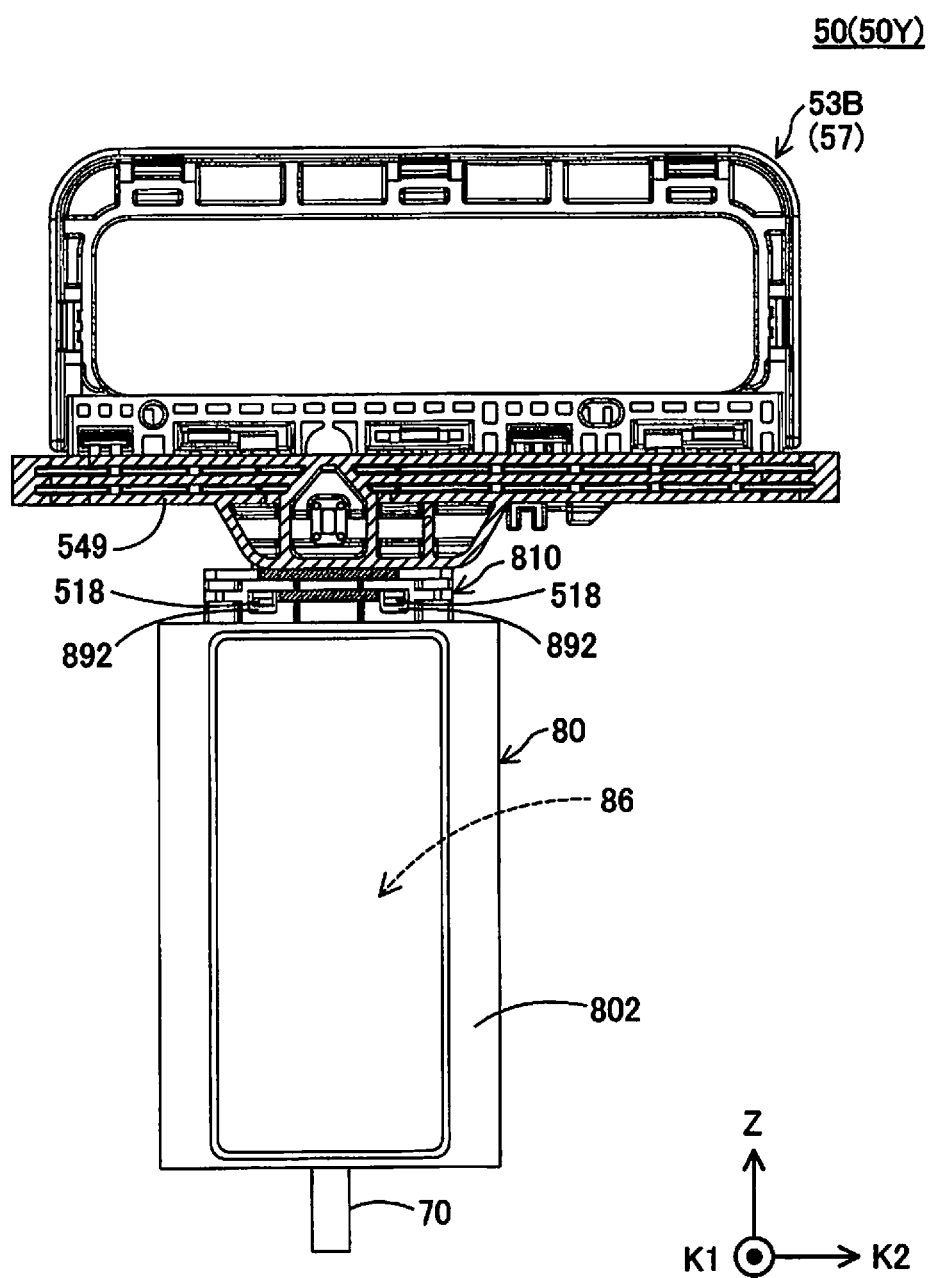
FIG. 27 is a diagram for explaining the mounting method of the filter unit.

FIG. 25 to FIG. 27 are drawings for explaining the installation method of the filter unit. As shown in FIG. 24 and FIG. 25, the end member 550A of the liquid supply portion 57 presses on the first opening 81a of the filter unit 80. In addition, as shown in FIG. 25 and FIG. 27, the supply portion-side engagement portion 518 of the liquid supply portion 57 is inserted into the receiving portion 898 (FIG. 21) to engage the unit-side engagement portion 892. Next, as shown in FIG. 26 and FIG. 27, the first opening forming member 810 and the installation portion 549 are joined by thermal welding to the liquid storage portion 52. To facilitate understanding, in FIG. 26 and FIG. 27, single hatching is applied to the first opening forming member 810 and the portion joined in the liquid storage portion 52 of the installation portion 549. Thus, the frame 83 is finally fixed at a position by joining the frame 83 to the liquid storage portion 52 after the position is somewhat fixed by (i) pressing on the liquid supply portion 57, and (ii) engaging the supply portion-side engagement portion 518 with the unit-side engagement portion 892.

A-5. Effects

According to the above embodiment, as shown in FIG. 24, the filter 804 can be used to efficiently capture foreign matter in the ink. Thus, the possibility of foreign matter flowing out to the printer 10 can be reduced. In addition, generally, the air bubbles generated in the ink readily adhere to the filter 804. However, the air bubbles in the ink are absorbed by the low pressure chamber 88, and the possibility of the air bubbles adhering to the filter 804 can be reduced. Thus, ink can be smoothly supplied from the liquid storage container 50Y to the printer 10.

In addition, according to the above embodiment, as shown in FIG. 25, the flow path forming member 70 is provided with a connection portion 70e2 that connects to the second opening 81b, and an introduction portion 70e1 that is positioned further from the filter unit 80 than the connection portion 70e2 and introduces the ink of the liquid storage portion 52 into the flow path forming member 70. By doing this, the ink introduced into the flow path forming member 70 from the introduction portion 70e1 that is positioned further separated from the filter unit 80 than the connection portion 70e2 flows into the filter chamber 84. Thus, foreign matter included in ink at positions separated from the filter unit 80 in the ink in the liquid storage portion 52 can be captured by the filter 804.

In addition, according to the embodiment described above, as shown in FIG. 24, the flow path 84B (second chamber 84B) that passes through the filter 804 of the filter chamber 84 is configured so that cross-sectional area of the flow path on the upstream side 84Ba is smaller than that on the downstream side 84Bb. By doing this, nonuniform amounts of ink flowing through the filter 804 into the second chamber 84B can be suppressed at each position of the filter 804 (upstream side and downstream side of the filter 804). That is, the possibility of passing ink locally only in the portion of the filter 804 can be reduced. By doing this, the possibility of concentrating and capturing foreign matter only in one portion of the filter 804 can be reduced. The entire filter 804 can be used to efficiently capture foreign matter in the ink.

According to the embodiment described above, as shown in FIG. 24 and FIG. 26, the liquid supply portion 57 is pushed in the first opening 81a of the filter unit 80, and a portion of the filter unit 80 joins to the liquid storage portion 52. By doing this, the filter unit 80 is fixed by the liquid supply portion 57 and the liquid storage portion 52. Thus, even when a shock is applied to the liquid storage container 50Y when the liquid storage container 50Y drops down, the possibility of the filter unit 80 falling off of the liquid supply portion 57 can be reduced. The possibility of the filter unit 80 falling off of the liquid supply portion 57 is reduced, and the filter unit 80 can be used to stably capture foreign matter in the ink directed toward the liquid supply portion 57. In addition, a portion of the liquid supply portion 57 (installation portion 549) joins to the liquid storage portion 52. By doing this, the possibility of the filter unit 80 falling off of the liquid supply portion 57 can be further reduced.

B. Modified Example

The present invention is not limited to the working examples and embodiments described above, and may be implemented in various modes within a scope that does not deviate from the intent. For example, the following modifications are possible.

B-1. First Modified Example

In the embodiments described above, the filter chamber 84 and the low pressure chamber 88 are adjacent, but may be arranged at separated positions. For example, the low pressure chamber 88 may be formed from a different member than the frame 83, and arranged at a different position than the filter chamber 84.

In addition, the cross-sectional area of the flow path of the second chamber 84B (FIG. 24) was configured so that the upstream side 84Ba that is in contact with the filter 804 was smaller than that of the downstream side 84Bb in contact with the filter 804, but the cross-sectional area of the flow paths of the upstream side 84Ba and the downstream side 84Bb may be the same, or may differ.

B-2. Second Modified Example

In the embodiments described above, the liquid storage portion 52 was formed from a member having flexibility, but is not limited to this, if able to function as a liquid storage portion that can store liquid internally. For example, the liquid storage portion 52 may be formed from a member in which a portion has flexibility, or may be formed by a rigid member having a volume that does not change regardless of the amount of exhausted liquid.

B-3. Third Modified Example

The present invention is not limited to an inkjet printer and liquid storage container 50 thereof, and may also be applied to any printing apparatus that ejects a liquid other than ink (liquid ejecting apparatus) and the liquid storage body thereof for storing the liquid. For example, application is possible to the various types of liquid ejecting apparatus shown below and the liquid storing body thereof.
(1) Image recording apparatus, such as a facsimile machine
(2) Color ejecting apparatus that is used in the manufacture of color filters for image display apparatus, such as liquid crystal displays
(3) Electrode ejecting apparatus used in forming the electrodes in organic electroluminescent displays or field emission display (FED) displays
(4) Liquid ejecting apparatus that ejects liquids including live organic material used in biochip manufacturing
(5) Test material ejecting apparatus as a precision pipette
(6) Ejecting apparatus of lubricating oils
(7) Ejecting apparatus of resin liquids
(8) Liquid ejecting apparatus that ejects lubricating oils at pin points in precision machines, such as clocks and cameras
(9) Liquid ejecting apparatus that ejects transparent resin liquids, such as ultraviolet curable resin liquids, onto a substrate in order to form nanolenses (optical lenses) used in optical communication elements
(10) Liquid ejecting apparatus that ejects acidic or alkaline etching fluids to etch, for example, a substrate
(11) Liquid ejecting apparatus provided with liquid ejecting heads that eject droplets having other minute volumes A "droplet" refers to the state of the liquid that is ejected from the liquid ejecting apparatus and includes objects that have a tail in a granular form, tear shape, or thread shape. In addition "liquid" may be a material that the liquid ejecting apparatus is able to eject. For example, "liquid" may be materials in a state when matter is in the liquid phase; and materials in liquid state with high or low viscosity, sol, gel water, and other materials in the liquid state such as inorganic solvents, organic solvents, solutions, liquid resins, liquid metals (molten metal) are also included in "liquid." Liquid is not regarded as one state of matter, and also includes grains of functional materials composed of solid materials, such as pigments or metal particles, dissolved, dispersed, or mixed in a solvent. In addition, a representative example of liquid is ink as explained in the embodiments described above or liquid crystal, and the like. Inks include various liquid composite materials such as common aqueous inks, oil-based inks, gel inks, and hot metal inks. In addition, when UV inks curable by irradiating with ultraviolet light are stored in liquid storage pouch unit and connected to the printer, the possibility is reduced for curing by the transmission of the heat of installation surface to the liquid storage pouch because the liquid storage pouch floats above the installation surface.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "unit," "section," "portion," "member" or "element" when used in the singular can have the dual meaning of a single portion or a plurality of portions. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A liquid storage container, comprising:
a liquid storage portion configured and arranged to store liquid;
a liquid supply portion having a liquid supply flow path provided in an interior of the liquid supply portion, the liquid supply flow path being configured and arranged to supply the liquid in the liquid storage portion to a liquid ejecting apparatus; and
a filter unit arranged inside of the liquid storage portion and connected to the liquid supply portion, the filter unit having
a frame including a first opening connecting to the liquid supply flow path, a second opening connecting to an interior of the liquid storage portion, and a wall extending between the first opening and the second opening in an extending direction,
a connection flow path connecting the first opening and the second opening,
a filter chamber including a filter that is installed in the filter chamber and is permeable to the liquid in a first direction intersecting the extending direction, the filter chamber being arranged in the connection flow path and arranged in a second direction opposite the first direction relative to the wall, a low pressure chamber including a low pressure chamber film, and arranged in the first direction relative to the wall at a different position from the connection flow path.

2. The liquid storage container according to claim 1, wherein the low pressure chamber is adjacent to the filter chamber.

3. The liquid storage container according to claim 1, further comprising
a flow path forming member arranged inside of the liquid storage portion and configured to introduce the liquid in the liquid storage portion through the second opening to the connection flow path, the flow path forming member including
a connection portion connected to the second opening, and
an introduction portion configured and arranged to introduce the liquid in the liquid storage portion into the flow path forming member at a position further separated from the filter unit than the connection portion.

4. The liquid storage container according to claim 1, wherein
the connection flow path is configured so that a cross-sectional area of the flow path on an upstream side of the flow path after passing the filter in the filter chamber is smaller than a cross-sectional area on a downstream side of the flow path in a flow direction of the liquid that flows from the second opening to the first opening.

5. The liquid storage container according to claim 1, wherein
the liquid supply portion has a supply portion-side engagement portion configured and arranged to be engaged with the filter unit,
the filter unit has a unit-side engagement portion configured and arranged to be engaged with the supply portion-side engagement portion,
the liquid supply portion is pushed into the first opening of the filter unit, and
a portion of the filter unit is joined to the liquid storage portion.

6. The liquid storage container according to claim 5, wherein
a portion of the liquid supply portion is joined to the liquid storage portion.

7. The liquid storage container according to claim 1, wherein
the low pressure chamber includes a low pressure chamber section that has lower pressure than atmospheric pressure and is arranged between the wall and the lower pressure chamber film in the first direction.

* * * * *